US012673275B2

(12) United States Patent
Cronin et al.

(10) Patent No.: US 12,673,275 B2
(45) Date of Patent: Jul. 7, 2026

(54) SYSTEM AND METHOD FOR DEAERATION

(71) Applicant: Donaldson Company, Inc., Minneapolis, MN (US)

(72) Inventors: Michael J. Cronin, Apple Valley, MN (US); Michael J. Gustafson, Minnetonka, MN (US); Vijay K. Kapoor, Eagan, MN (US); Mike J. Madsen, Chaska, MN (US); Daniel R. Frembgen, Savage, MN (US); Davis B. Moravec, Burnsville, MN (US); Matthew P. Goertz, Bloomington, MN (US); Divya Panchanathan, Edina, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 17/426,542

(22) PCT Filed: Jan. 28, 2020

(86) PCT No.: PCT/US2020/015449
§ 371 (c)(1),
(2) Date: Jul. 28, 2021

(87) PCT Pub. No.: WO2020/160014
PCT Pub. Date: Aug. 6, 2020

(65) Prior Publication Data
US 2022/0088505 A1 Mar. 24, 2022

Related U.S. Application Data

(60) Provisional application No. 62/798,272, filed on Jan. 29, 2019.

(51) Int. Cl.
*B01D 19/00* (2006.01)
*F01P 11/02* (2006.01)
(Continued)

(52) U.S. Cl.
CPC ..... *B01D 19/0042* (2013.01); *B01D 19/0031* (2013.01); *B01D 2239/1216* (2013.01);
(Continued)

(58) Field of Classification Search
CPC .... B01D 2239/1216; B01D 2239/1266; B01D 2239/1291; B01D 46/003; B01D 46/0031;
(Continued)

(56) References Cited

U.S. PATENT DOCUMENTS 3,112,190 A * 11/1963 Topol ................... B01D 35/185
55/318
3,246,637 A 4/1966 Walsh
(Continued)

FOREIGN PATENT DOCUMENTS

CN 1957068 A 5/2007
CN 1980728 A 6/2007
(Continued)

OTHER PUBLICATIONS

International PCT Application No. PCT/US2021/041404 filed Jul. 13, 2021, PCT International Search Report and Written Opinion, issued Sep. 28, 2021, 13 pages.
(Continued)

*Primary Examiner* — T. Bennett Mckenzie
(74) *Attorney, Agent, or Firm* — Mueting Raasch Group

(57) ABSTRACT

A deaerator includes gas nucleation media and a porous barrier. The deaerator may include growth media between the gas nucleation media and the porous barrier. The deaerator may be part of a system for removing gas from a fluid, where the system includes a tank with a fluid inlet and a fluid outlet and having a fluid flow path from the fluid inlet to the fluid outlet, and where the deaerator is in the fluid flow path. A method for removing gas from a fluid includes passing the fluid through the deaerator defining a fluid flow path.

18 Claims, 14 Drawing Sheets

(51) Int. Cl.
　　*F15B 21/044*　　　　(2019.01)
　　*F16N 39/00*　　　　(2006.01)
(52) U.S. Cl.
　　CPC ................ *B01D 2239/1266* (2013.01); *B01D 2239/1291* (2013.01); *F01P 11/028* (2013.01); *F15B 21/044* (2013.01); *F16N 39/002* (2013.01)
(58) Field of Classification Search
　　CPC ............ B01D 19/0031; B01D 19/0042; B01D 19/02; F15B 21/08; F15B 21/044; F15B 1/26; F01P 11/028; F16N 39/002
　　USPC ...................................... 95/241–266; 55/527
　　See application file for complete search history.

(56)　　　　　　　References Cited

U.S. PATENT DOCUMENTS

| | | | |
|---|---|---|---|
| 3,523,408 A | 8/1970 | Rosenberg | |
| 3,631,654 A | 1/1972 | Riely et al. | |
| 4,098,328 A | 7/1978 | Cheong | |
| 4,568,367 A | 2/1986 | Gremel et al. | |
| 4,572,724 A | 2/1986 | Rosenberg et al. | |
| 4,664,682 A * | 5/1987 | Monzen .............. | A61M 1/3627 96/219 |
| 4,787,921 A * | 11/1988 | Shibata ............. | B01D 19/0031 96/219 |
| 4,909,937 A | 3/1990 | Hoffmann et al. | |
| 5,162,102 A * | 11/1992 | Nogawa ............. | A61M 1/1698 210/500.24 |
| 5,362,406 A | 11/1994 | Gsell et al. | |
| 5,536,413 A | 7/1996 | Bormann et al. | |
| 5,951,862 A | 9/1999 | Bradford | |
| 6,017,474 A | 1/2000 | Teo et al. | |
| 6,033,462 A | 3/2000 | Dekker et al. | |
| 6,096,120 A | 8/2000 | Erlund et al. | |
| 6,176,904 B1 | 1/2001 | Gupta | |
| 6,422,224 B1 | 7/2002 | Walker, Jr. | |
| 6,506,340 B1 * | 1/2003 | Tsai ...................... | A61M 1/325 604/4.01 |
| 6,605,210 B2 | 8/2003 | Reinhardt | |
| 7,309,372 B2 | 12/2007 | Kahlbaugh et al. | |
| 7,314,497 B2 | 1/2008 | Kahlbaugh et al. | |
| 7,531,026 B2 | 5/2009 | Follette et al. | |
| 7,926,327 B2 | 4/2011 | Schmidt | |
| 8,043,420 B2 | 10/2011 | Konishi et al. | |
| 8,057,567 B2 | 11/2011 | Webb et al. | |
| 8,118,921 B2 | 2/2012 | Ingvast et al. | |
| 8,268,033 B2 | 9/2012 | Rogers et al. | |
| 8,277,529 B2 | 10/2012 | Rogers et al. | |
| 8,512,435 B2 | 8/2013 | Rogers et al. | |
| 8,641,796 B2 | 2/2014 | Rogers et al. | |
| 9,518,913 B2 | 12/2016 | Wilhelm | |
| 9,782,695 B2 | 10/2017 | Simcina et al. | |
| 9,795,906 B2 | 10/2017 | Rogers et al. | |
| 2002/0194988 A1 | 12/2002 | Betting et al. | |
| 2003/0085165 A1 * | 5/2003 | Shane .................... | B01D 29/21 210/85 |
| 2004/0262217 A1 * | 12/2004 | Mori .................. | B01D 39/1692 210/493.1 |
| 2005/0051486 A1 * | 3/2005 | Zuk ..................... | A61M 1/3633 604/406 |
| 2005/0066812 A1 | 3/2005 | Vesper et al. | |
| 2005/0145561 A1 * | 7/2005 | Takai ..................... | B01D 69/08 210/500.37 |
| 2005/0218074 A1 | 10/2005 | Pollock | |
| 2005/0261530 A1 | 11/2005 | Stell et al. | |
| 2006/0242933 A1 | 11/2006 | Webb et al. | |
| 2007/0084776 A1 * | 4/2007 | Sasur .................. | B01D 36/003 210/493.1 |
| 2007/0231233 A1 | 10/2007 | Bose | |
| 2009/0020486 A1 | 1/2009 | Barnwell | |
| 2010/0122899 A1 | 5/2010 | Hartman et al. | |
| 2010/0285297 A1 | 11/2010 | Bansal et al. | |

| | | | |
|---|---|---|---|
| 2010/0320142 A1 * | 12/2010 | Ge et al. | |
| 2011/0174158 A1 * | 7/2011 | Walls .................. | D01D 5/0092 96/60 |
| 2012/0097194 A1 * | 4/2012 | McDaniel ............. | A01N 63/50 435/197 |
| 2012/0234748 A1 | 9/2012 | Little et al. | |
| 2012/0318754 A1 * | 12/2012 | Cox ........................ | D04H 3/16 210/489 |
| 2013/0037481 A1 * | 2/2013 | Lalouch ............. | D04H 1/43835 427/244 |
| 2013/0126418 A1 * | 5/2013 | Lim ....................... | B01D 29/11 210/493.1 |
| 2013/0180401 A1 | 7/2013 | Ren et al. | |
| 2013/0269533 A1 * | 10/2013 | Rathod ................ | B01D 29/232 96/219 |
| 2013/0277297 A1 * | 10/2013 | Suzuki ............... | A61M 1/3633 210/500.1 |
| 2014/0069874 A1 * | 3/2014 | Hubbard ................ | B01D 29/54 210/741 |
| 2014/0087088 A1 * | 3/2014 | Schmitt .................. | D21H 19/20 427/373 |
| 2014/0303050 A1 * | 10/2014 | Tomikawa ............ | F16C 33/203 508/108 |
| 2014/0326661 A1 * | 11/2014 | Madsen ............. | B01D 39/1623 210/505 |
| 2014/0331626 A1 * | 11/2014 | Nagy ................. | B01D 39/1623 55/487 |
| 2015/0027942 A1 * | 1/2015 | Chen ...................... | B01D 17/02 210/323.2 |
| 2015/0031124 A1 * | 1/2015 | Ward ................. | H01M 8/04276 204/252 |
| 2015/0122720 A1 * | 5/2015 | Boiger ................... | B01D 17/10 210/314 |
| 2015/0257357 A1 | 9/2015 | Innings et al. | |
| 2015/0283479 A1 | 10/2015 | Perreault et al. | |
| 2015/0283487 A1 * | 10/2015 | Demmel ................ | B01D 39/14 210/500.21 |
| 2015/0360181 A1 * | 12/2015 | Neitzel .............. | B01D 39/1692 210/483 |
| 2016/0033212 A1 * | 2/2016 | Wang .................... | F28F 13/187 165/104.21 |
| 2016/0047186 A1 | 2/2016 | Cady et al. | |
| 2016/0059167 A1 * | 3/2016 | Nagy ................. | B01D 39/1623 55/487 |
| 2016/0061234 A1 | 3/2016 | Doll et al. | |
| 2016/0121242 A1 * | 5/2016 | Bentlohner .......... | B01D 46/521 210/493.2 |
| 2016/0136554 A1 * | 5/2016 | Swaminathan .... | B01D 39/1623 55/486 |
| 2016/0279538 A1 | 9/2016 | Kozyuk | |
| 2016/0303498 A1 * | 10/2016 | Doucouré .......... | B01D 39/2065 |
| 2017/0225101 A1 | 8/2017 | Schlichter et al. | |
| 2017/0225105 A1 | 8/2017 | Rogers et al. | |
| 2017/0340992 A1 | 11/2017 | Okamoto et al. | |
| 2018/0104628 A1 * | 4/2018 | Taku ...................... | B01D 29/07 |
| 2018/0154053 A1 * | 6/2018 | Shimada ............ | B01D 39/1623 |
| 2018/0160747 A1 * | 6/2018 | Epperson .............. | A41D 31/12 |
| 2018/0169551 A1 * | 6/2018 | Jaganathan ........ | B01D 39/1623 |
| 2018/0236388 A1 | 8/2018 | Harris et al. | |
| 2018/0257042 A1 | 9/2018 | Hester et al. | |
| 2019/0022559 A1 | 1/2019 | Studer et al. | |
| 2019/0126172 A1 | 5/2019 | Cardillo, Jr. et al. | |
| 2019/0292377 A1 | 9/2019 | Rapp et al. | |
| 2020/0016518 A1 * | 1/2020 | Olschok ................ | B01D 46/64 |
| 2020/0038785 A1 * | 2/2020 | Ishizuka ............. | B01D 29/58 |
| 2020/0094170 A1 | 3/2020 | Bikkina | |
| 2020/0319281 A1 * | 10/2020 | Papasakellariou ......................... | G01R 33/4838 |
| 2022/0362687 A1 | 11/2022 | Madsen et al. | |

FOREIGN PATENT DOCUMENTS

| | | |
|---|---|---|
| CN | 101791494 | 8/2010 |
| CN | 109097129 | 12/2018 |
| CN | 111356488 A | 6/2020 |
| DE | 4017229 | 12/1990 |
| DE | 19717287 | 10/1998 |

(56) References Cited

FOREIGN PATENT DOCUMENTS

| | | | |
|---|---|---|---|
| DE | 102014000903 | | 7/2015 |
| EP | 0122748 | A1 | 10/1984 |
| EP | 0 455 950 | | 8/1995 |
| EP | 2 479 553 | | 7/2012 |
| EP | 2 138 268 | | 11/2016 |
| GB | 2022434 | A | 12/1979 |
| JP | 2005-212776 | A | 8/2005 |
| JP | 2016-140847 | | 8/2016 |
| JP | 2017006830 | A | 1/2017 |
| JP | 2018501856 | A | 1/2018 |
| WO | 93/22029 | A1 | 11/1993 |
| WO | 98/17369 | | 4/1998 |
| WO | 2014/088882 | | 6/2014 |
| WO | 2014/125612 | | 8/2014 |
| WO | 2014165560 | A2 | 10/2014 |
| WO | 2016/023610 | | 2/2016 |
| WO | 2019/032773 | | 2/2019 |
| WO | 2020/160014 | | 8/2020 |
| WO | 2021/081341 | | 4/2021 |
| WO | 2022/015714 | | 1/2022 |

OTHER PUBLICATIONS

International Patent Application No. PCT/US2020/015449 filed Jan. 28, 2020; PCT Invitation to Pay Additional Fees, issued Apr. 15, 2020; 10 pages.

International Patent Application No. PCT/US2020/015449 filed Jan. 28, 2020; PCT International Search Report and Written Opinion, mailed Jul. 2, 2020; 14 pages.

International Patent Application No. PCT/US2020/015449 filed Jan. 28, 2020; PCT International Preliminary Report on Patentability issued Jul. 27, 2021, 9 pages.

International Patent Application No. PCT/US2020/057084, filed Oct. 23, 2020, Invitation to Pay Additional Fees and Partial Search Report, mailed Feb. 4, 2021, 11 pages.

International Patent Application No. PCT/US2020/057084, filed Oct. 23, 2020, International Search Report and Written Opinion, mailed Mar. 25, 2021, 15 pages.

Hydac Poster, "Design and optimization of tank systems," BFPA Technical Conference 2018, British Fluid Power Association, Bath, United Kingdom, Sep. 10-11, 2018, 1 page.

"Hydac Filtertechnik RT Filter Technik: RT Return Line Filter" brochure, Hydac Filtertechnik GmbH, Sulzbach/Saar, Germany, 12 pages. Available as early as Sep. 5, 2018.

Otsu, "A Threshold Selection Method from Gray-Level Histograms", Jan. 1979, IEEE Transactions on Systems, Man, and Cybernetics; vol. SMC-9, No. 1, pp. 62-66.

International Patent Application No. PCT/US2020/057084, filed Oct. 23, 2020, International Preliminary Report on Patentability, issued Apr. 26, 2022, 10 pages.

International Patent Application No. PCT/US2021/041404, filed Jul. 13, 2021, International Preliminary Report on Patentability, issued Jan. 17, 2023, 9 pages.

"Particle Size Conversion", 2008, Retrieved from http://www.sigmaaldrich.com/Area_of_Interest/Research_Ess.esources/Technical_Library/ Particle_Size_Conversion.html, 2 Pages.

* cited by examiner

SYSTEM AND METHOD FOR DEAERATION

CROSS-REFERENCE TO RELATED APPLICATIONS

The present application is the § 371 U.S. National Stage of International Application No. PCT/US2020/015449, filed 28 Jan. 2020, which claims the benefit of U.S. Provisional Application Ser. No. 62/798,272, filed on 29 Jan. 2019, the disclosures of which are incorporated herein by reference in their entireties.

FIELD

The present application relates to systems and methods for deaeration of fluids.

BACKGROUND

Various systems that utilize fluids may benefit from removal of air from the fluid (e.g., deaeration). In particular, systems where the same fluid remains within the system for a length of time may experience air buildup in the fluid. For example, systems where the fluid circulates through the system multiple times, such as hydraulic systems, may experience air buildup in the fluid, causing the performance of the system to suffer.

Hydraulic systems, and specifically hydraulic machines, rely on hydraulic fluid to perform work. Common examples of hydraulic systems include hydraulic machines, hydraulic drive systems, hydraulic transmission systems, hydraulic brakes, etc. Because the hydraulic fluid typically remains in the system for a length of time and goes through periods of high pressure and low pressure, air may build up in the fluid. Air in the fluid may be present in various forms, including dissolved air and free air. Free air can include entrained air and foam. The presence of air may cause pump cavitation with symptoms like component wear and increased noise, or a decrease in the fluid bulk modulus, resulting in reduced efficiency of the hydraulic system and reduced controllability.

It would be desirable to provide a system and method for deaerating fluids. It would further be desirable to provide a system and method for deaerating hydraulic fluids and compatible with hydraulic systems.

SUMMARY

In accordance with principles of this disclosure, a deaerator is provided. The deaerator includes gas nucleation media. Growth media may be disposed adjacent the gas nucleation media. A porous barrier is disposed adjacent the growth media. The deaerator may be part of a system for removing gas (e.g., air) from a fluid, where the system includes a tank with a fluid inlet and a fluid outlet and having a fluid flow path from the fluid inlet to the fluid outlet, and where the deaerator is in the fluid flow path.

A method for removing gas (e.g., air) from a fluid is provided. The method involves passing the fluid through a deaerator. The deaerator defines a fluid flow path and includes gas nucleation media arranged in the fluid flow path. Growth media is arranged in the fluid flow path downstream of the gas nucleation media. A porous barrier is arranged in the fluid flow path downstream of the growth media.

A system for removing gas from a fluid is provided. The system includes a tank with a fluid inlet and a fluid outlet and having a fluid flow path from the fluid inlet to the fluid outlet; and a deaerator. The includes gas nucleation media. Growth media may be disposed adjacent the gas nucleation media. A porous barrier is disposed adjacent the growth media.

The deaerator may include gas nucleation media, a porous barrier adjacent the gas nucleation media, and a gap between the gas nucleation media and the porous barrier. The porous barrier may have openings sized 250 μm or less.

DETAILED DESCRIPTION

Figure 1:
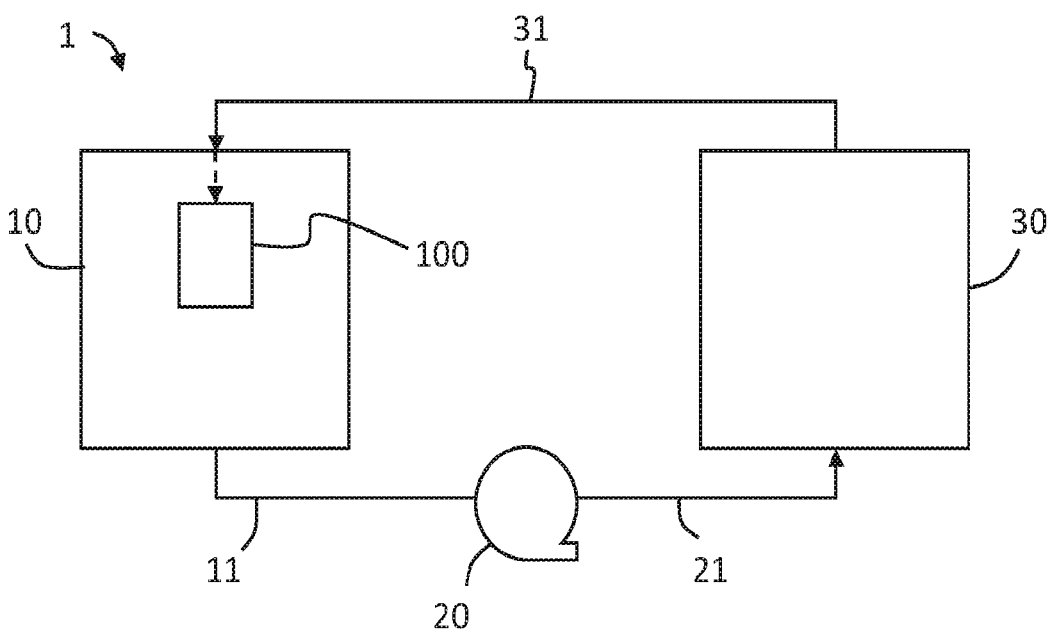
FIG. 1 is a schematic flow diagram of a hydraulic system according to an embodiment.

The present disclosure relates to systems and methods for removing gases, such as air, from fluids. The systems and methods of this disclosure are particularly useful for removing air from (e.g., deaerating) fluids used in recirculating systems, such as hydraulic systems.

The term "fluid" is used in this disclosure to describe substances that are in the liquid phase. A fluid may have gas compounds dissolved or entrained in it.

The terms "deaerate" and "deaeration" are used here to refer to removal of air or any other gas from a fluid.

The term "adjacent" is used here with the meaning of "next to." A feature that is "adjacent" may or may not be in contact with the adjacent feature. For example, features that are "adjacent" may be separated by a gap.

The term "immediately adjacent" is used here with the meaning of in contact with the adjacent feature. The term "immediately adjacent" may be used to indicate the lack of intervening features.

The term "substantially" as used here has the same meaning as "significantly," and can be understood to modify the term that follows by at least about 75%, at least about 90%, at least about 95%, or at least about 98%. The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "nominal" in the context of mesh size, pore size, fiber diameter or wire diameter is used here to refer to the marked or reported mesh or pore size of a commercially available product.

The unit "psi" is used here to refer to pounds-force per square inch. One (1) psi is equal to approximately 6900 Pascal, or about 6.9 kPa.

Any reference to standard methods (e.g., ASTM, TAPPI, AATCC, etc.) refer to the most recent available version of the method at the time of filing of this disclosure unless otherwise indicated.

The term "about" is used here in conjunction with numeric values to include normal variations in measurements as expected by persons skilled in the art and is understood have the same meaning as "approximately" and to cover a typical margin of error, such as ±5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

According to some embodiments, gas may be removed from a fluid by inducing nucleation of gas and allowing the gas to escape. Nucleation may be induced by bringing the fluid in contact with a material that provides a nucleation site for the gas. Nucleation of the gas may cause free gas cavities to form. Gas cavities may be further grown and/or coalesced in one or two or multiple stages to increase the size of the gas cavities and thereby increasing their buoyancy, increasing the speed at which the gas rises within the fluid. The terms "gas cavity" and "bubble" are used here interchangeably.

Certain types of vehicles, such as excavators, loaders, skid steer loaders and the like, include on-board hydraulic systems. For various reasons, such as a desire to improve efficiency, there is a desire to improve the hydraulic system and, in particular, downsize the hydraulic fluid tank. However, smaller tanks may exacerbate issues with air in the hydraulic fluid (e.g., oil) due to shorter residence times of the fluid in the tank. A short residence time may not allow air in the fluid to leave the fluid before the fluid is again drawn out of the tank. The device and method of the present disclosure may be advantageous because of their ability to remove air, including dissolved air, small air cavities, and entrained air, from fluids such as hydraulic fluid or oil. The device and method may further be advantageous due to their ability to be downsized for use in smaller hydraulic tanks, such as those used in mobile hydraulic systems used in vehicles, e.g., excavators, loaders, skid steer loaders, or other systems with downsized hydraulic tanks.

A schematic of a hydraulic system 1 according to the present disclosure is shown in FIG. 1. The hydraulic system 1 includes a tank 10 for housing a hydraulic fluid. The system 1 also includes a pump 20 that transfers fluid from the tank 10 to one or more hydraulic applications 30. Examples of hydraulic applications 30 include hydraulic machines, hydraulic drive systems, hydraulic transmission systems, hydraulic brakes, and the like. The fluid flows from the tank 10 to the pump 20 via output line 11 and from the pump 20 to the hydraulic applications 30 via output line 21. The pump 20 applies pressure to the fluid, and thus fluid in the output line 21 is under a higher pressure than fluid in the tank 10 or in the output line 11. The pressurized fluid may be used to perform work in the hydraulic applications 30. The fluid may return from the hydraulic applications 30 to the tank via return line 31.

The system 1 includes a deaerator 100. The deaerator 100 is constructed to remove at least a portion of gas dissolved and/or entrapped in the fluid. The deaerator 100 may be positioned within the tank 10 as shown, or may be placed elsewhere in the system 1. For example, the deaerator 100 may be placed in-line along the return line 31. According to an embodiment, the deaerator 100 is arranged in a flow path of fluid flowing through or within the tank 10. For example, the deaerator 100 may be placed in the flow path of fluid discharged into the tank 10 from the return line 31. The direction of flow may be from top to bottom, as shown in FIG. 1, where fluid from the return line 31 flows into the tank 10 from the top. At least a portion of the fluid from the return line 31 may enter the deaerator 100.

The system 1 may include additional components, such as additional tanks, lines, pumps, meters, controls, etc.

Schematic cross-sectional diagrams of the deaerator 100 according to the present disclosure are shown in FIGS. 2A-2D. The deaerator 100 includes gas nucleation media 110 arranged in the flow path of the fluid in the tank 10. The deaerator 100 further includes growth media 120 downstream of the gas nucleation media 110. A porous barrier 130 may be arranged downstream of the gas nucleation media 110 and/or the growth media 120.

The gas nucleation media 110, the growth media 120, and/or the porous barrier 130 may be disposed in a through-flow configuration in the fluid path. In some embodiments, at least one of the layers of gas nucleation media 110, the growth media 120, and/or the porous barrier 130 is disposed in a cross-flow configuration. The term "through-flow configuration" is used here to refer to an arrangement where the fluid flows through the media. The term "cross-flow configuration" is used here to refer to an arrangement where fluid flows across (or over) the media.

Figure 2A:
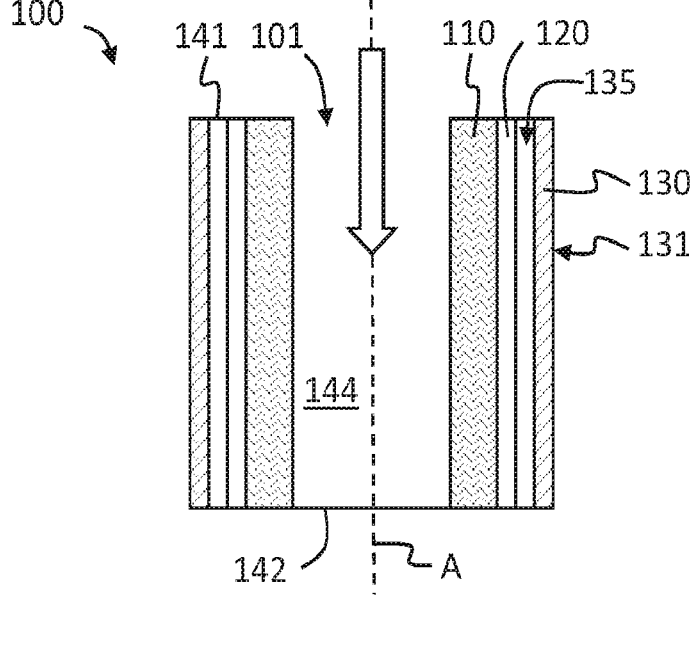
FIGS. 2A-2D are schematic cross-sectional views of deaerator units used in the hydraulic system of FIG. 1 according to embodiments.
Figure 2B:
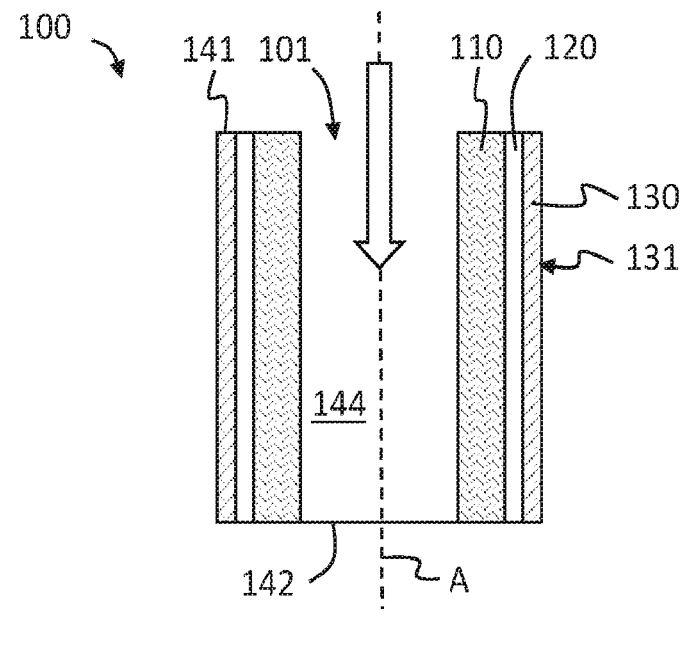
Figure 2C:
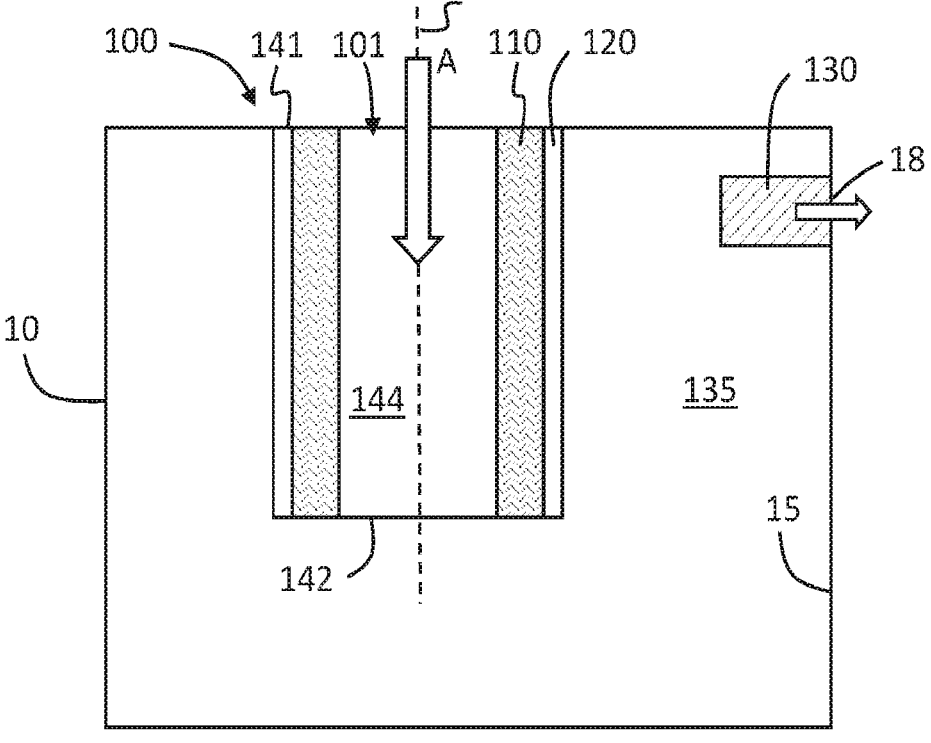
Figure 2D:
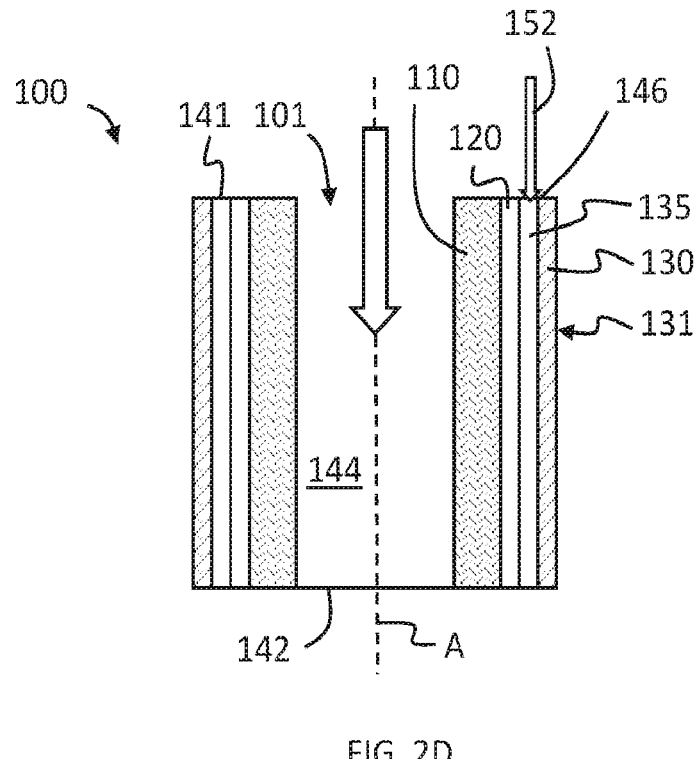

The deaerator 100 may have an open interior 144 with an inlet 101 for receiving incoming fluid flow. The inlet 101 may be defined as an opening in a first end cap 141. The particular inlet 101 depicted is configured as a top inlet being an opening into the open interior 144. Alternate inlet arrangements, locations and direction are possible. For example, the inlet 101 may be positioned at the bottom or at a side of the deaerator unit 100. However, the top inlet depicted is convenient and advantageous. The inlet 101 may include features for coupling the deaerator 100 with the tank 10 and for directing the flow of fluid into the open interior 144. The deaerator 100 may further include additional or alternative flow paths, such as case drain flow (excess flow from pump), drainage, overflow, return flow, and the like. Such additional or alternative flow paths may flow back into the tank 10. In one embodiment, case drain flow 152 is flown into the deaerator 100. For example, case drain flow 152 may be flown into the gap 135 between the porous barrier 130 and the growth media 120 through a secondary inlet 146 in the first end cap 141, as shown in FIG. 2D.

The gas nucleation media 110 may define the open interior 144 such that the gas nucleation media 110 at least partially surrounds the open interior 144. The gas nucleation media 110 may be arranged in the flow path of the fluid such that at least a portion of the fluid entering the open interior 144 flows through the gas nucleation media 110. In the example depicted, the gas nucleation media 110 is arranged in a cylindrical shape around the open interior 144. The cylindrical shape may have an open top including the inlet 101 and a closed bottom defined by a second end cap 142.

A layer of growth media 120 may be disposed adjacent the gas nucleation media 110. The growth media 120 may be immediately adjacent to (e.g., in contact with) the gas nucleation media 110. The growth media 120 may be arranged in the flow path of the fluid such that after flowing through the gas nucleation media 110, the fluid flows through the growth media 120. The growth media 120 may form a cylinder that is coaxial with and at least partially circumscribes the gas nucleation media 110.

Figure 3:
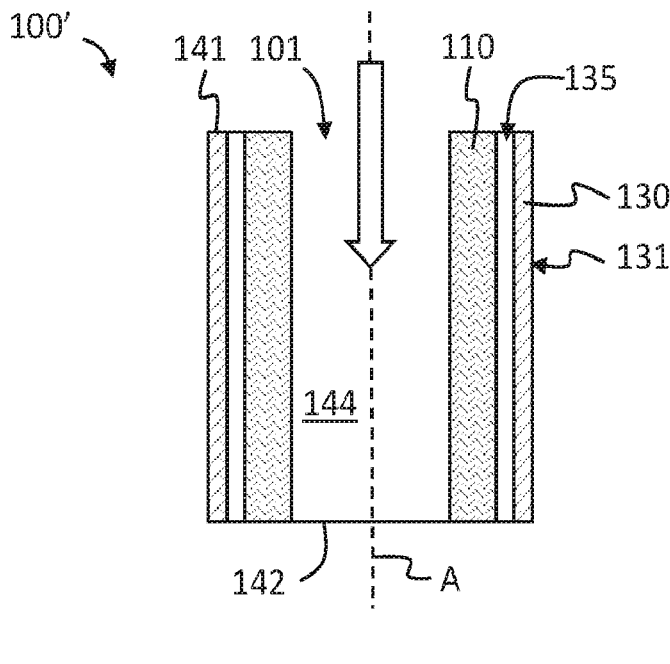
FIG. 3 is a schematic cross-sectional view of a deaerator unit used in the hydraulic system of FIG. 1 according to embodiments.

The deaerator 100 may further include a porous barrier 130 defining openings 131. The porous barrier 130 may be disposed adjacent the growth media 120, as shown in FIGS. 2A and 2B. In some embodiments, the deaerator 100' is otherwise similar to the deaerator 100 of FIG. 2A, including gas nucleation media 110 and the porous barrier 130, but does not include growth media, as shown in FIG. 3. In some embodiments, the porous barrier 130 is adjacent but not immediately adjacent to (e.g., is not in contact with) the growth media 120 or the gas nucleation media 110, leaving a gap 135 between the porous barrier 130 and the growth media 120 or between the porous barrier 130 and the gas nucleation media 110, as shown in FIGS. 2A and 3, respectively. In some embodiments, the porous barrier 130 is immediately adjacent to the growth media 120 such that there is no gap between the porous barrier 130 and the growth media 120, as shown in FIG. 2B. In some embodiments, the porous barrier 130 is formed by a strainer at an outlet 18 of the tank 10, as shown in FIG. 2C. In such embodiments, the gap 135 may be formed between the growth media 120 and the porous barrier 130 at the outlet 18. The porous barrier 130 may form a cylinder that is coaxial with and at least partially circumscribes the growth media 120 and the gas nucleation media 110. In some embodiments, the gas nucleation media 110, the growth media 120, and the porous barrier 130 define a cylindrical body. The first end (e.g., top) of the cylindrical body may be partially closed by the first end cap 141. The second end (e.g., bottom) of the cylindrical body may be closed by the closed second end cap 142.

When the deaerator unit 100 is in use, fluid is flown into the open interior 144 through the inlet 101 at the top. After fluid enters the open interior 144 it may pass through the gas nucleation media 110. The gas nucleation media 110 may cause at least some dissolved gases in the fluid to nucleate and to form free air, such as small gas cavities (first stage gas cavities). When the fluid further passes through the growth media 120 downstream of the gas nucleation media 110, more gas may come out of solution and add into the existing gas cavities, causing the gas cavities to grow. The gas cavities may also merge at the growth media 120. Growing and/or coalescing forms larger gas cavities (second stage gas cavities). The second stage gas cavities may begin to rise upward in the gap 135 between the growth media 120 and the porous barrier 130. In some embodiments, the openings 131 of the porous barrier 130 may be sized generally smaller than the second stage gas cavities generated by the growth media. The porous barrier 130 may act to hold the gas cavities in the gap 135, preventing the gas cavities from dispersing into the fluid in the tank 10 prematurely. Without wishing to be bound by theory, it is believed that the porous barrier may cause the gas cavities to further grow and/or coalesce on the upstream side of the porous barrier 130 and to rise upward within the gap 135. A gas pocket (a large gas cavity) may form at the top of the gap 135 from the risen coalesced gas when the porous barrier 130 is wetted. Once the gas pocket grows large enough, enough pressure builds for the gas pocket to break through the wetted porous barrier 130. As the gas breaks through the porous barrier, it may dry the porous barrier in the immediate area, allowing the air pocket to bleed out. However, even if the area of the porous barrier stays submerged and wetted, the gas cavity at the top of the gap may push through the porous barrier as a large bubble and float upward to the surface. If the deaerator is submerged, the gas pocket may be large and buoyant enough to rise to the surface and escape the surface. In the absence of the gas pocket, the porous barrier 130 will rewet and the process may repeat.

Referring back to FIGS. 2A-2D and 3, the gas nucleation media 110 may be made of any suitable material that is capable of inducing gas nucleation. Without wishing to be bound by theory, it is believed that multiple aspects of the gas nucleation media affect the effectiveness and efficiency of the media to induce nucleation based on the influence of the aspects on the chemical and physical interactions of the media with the fluid and the gas within the fluid. Aspects that may influence nucleation include, for example, surface area of fibers in the media; accessible surface area; fiber size (e.g., diameter or cross dimension); media pore size; presence of sharp edges or corners; surface roughness; the chemical composition of the media (e.g., fibers and binder); media oleophilicity/oleophobicity; presence and number of fiber intersections; angle of orientation of adjacent fibers; orientation relative to the direction of flow; tortuosity of the flow path; media sheet solidity; media sheet permeability; thickness of media sheet; residence time of the fluid in the media; the Peclet number of dissolved gas from the fluid to the media (e.g., the ratio of advective transfer rate vs. diffusive transfer rate); and differential pressure of the sheet and of individual fibers.

For example, it is believed that media with a suitable (accessible) surface area, fiber size, and media pore size is beneficial to nucleation efficiency. Accessible surface area of the fibers can be measured as the basis fiber surface area in the media and is understood to mean the overall surface area (including surface area inside pores and between fibers) in $m^2$ (meters squared) per bulk surface area of the media sheet in $m^2$, that can be accessed (e.g., contacted) by the fluid. The basis fiber surface area of the media can be determined by Branauer-Emmett-Teller (BET) analysis or from the Carmen-Kozeny relation (explained in detail below in Examples 3 and 4). The bulk surface area of the media sheet is understood to mean the area calculated as the length times width of the media sheet (for pleated media, the pleat height and the number of pleats may be used to calculate the width). The basis fiber surface area of the gas nucleation media may be 1 $m^2/m^2$ or greater, 1.5 $m^2/m^2$ or greater, 2 $m^2/m^2$ of media or greater, 5 $m^2/m^2$ of media or greater, 10 $m^2/m^2$ of media or greater, 25 $m^2/m^2$ or greater, 50 $m^2/m^2$ or greater, or 100 $m^2/m^2$ or greater, as measured either by the BET method or the Carmen-Kozeny method. The surface area of the gas nucleation media may be 200 $m^2/m^2$ or less, 150 $m^2/m^2$ or less, 100 $m^2/m^2$ or less, 50 $m^2/m^2$ or less, 30 $m^2/m^2$ or less, 10 $m^2/m^2$ or less, 6 $m^2/m^2$ or less, or 4 $m^2/m^2$ or less, as measured either by the BET method or the Carmen-Kozeny method. In one embodiment, the basis fiber surface area of the gas nucleation media is 1 $m^2/m^2$ or greater, 2 $m^2/m^2$ or greater, 5 $m^2/m^2$ or greater, as measured by the BET method. In one embodiment, the basis fiber surface area of the gas nucleation media is 100 $m^2/m^2$ or less, 50 $m^2/m^2$ or less, 20 $m^2/m^2$ or less, as measured by the BET method. In one embodiment, the fiber surface area of the gas nucleation media is 1 to 75 $m^2/m^2$, as measured by the BET method. In one embodiment, the basis fiber surface area of the gas nucleation media is 5 to 50 $m^2/m^2$, as measured by the BET method. In one embodiment, the basis fiber surface area of the gas nucleation media is 1 $m^2/m^2$ or greater, 5 $m^2/m^2$ or greater, or 10 $m^2/m^2$ or greater, as measured by the Carmen-Kozeny method. In one embodiment, the basis fiber surface area of the gas nucleation media is 200 $m^2/m^2$ or less, 100 $m^2/m^2$ or less, 50 $m^2/m^2$ or less, 20 $m^2/m^2$ or less, as measured by the Carmen-Kozeny method. In one embodiment, the basis fiber surface area of the gas nucleation media is 5 to 75 $m^2/m^2$, as measured by the Carmen-Kozeny method. In one embodiment, the basis fiber surface area of the gas nucleation media is 10 to 50 $m^2/m^2$, as measured by the Carmen-Kozeny method.

Fiber size is used here to refer to a diameter or cross dimension of the fibers of the media. The diameter or cross dimension of fibers may be determined optically for larger fibers, and by using SEM for smaller fibers. The fiber size of fibers within the gas nucleation media may vary from fiber to fiber and along a given fiber. The fiber size may also vary from the upstream side of the media to the downstream side of the media along a gradient. The fibers within the gas nucleation media may have a fiber size of at least 10 nm (nanometers), at least 50 nm, or at least 100 nm. The fibers within the gas nucleation media may have a fiber size of up to 10 μm (micrometers) or up to 100 μm.

Media pore size is understood to mean the size of individual pores in the media sheet as determined by ASTM F316-03 or ASTM D6767. The pores within the gas nucleation media may have a mean pore size of 0.5 μm or greater, 1 μm or greater, or 5 μm or greater. The pores within the gas nucleation media may have a mean pore size of 5 μm or less, 10 μm or less, 20 μm or less, 100 μm or less, or 200 μm or less. For example, the pores within the gas nucleation media may have a mean pore size of 5 μm to 100 μm. The pores within the gas nucleation media may have a maximum pore size of 1 μm or greater, 5 μm or greater, or 10 μm or greater. The pores within the gas nucleation media may have a maximum pore size of 10 μm or less, 20 μm or less, 100 μm or less, or 200 μm or less. For example, the pores within the gas nucleation media may have a maximum pore size of 5 μm to 200 μm. The values listed here are determined by ASTM F316-03.

The chemical composition of the media and the oleophilicity/oleophobicity of the media are believed to impact nucleation. The chemical composition of the media may include the chemical composition of fibers in the media and/or of any binders or other components used in the media. The fibers may include any suitable fibrous material, including woven or non-woven media made from organic or inorganic materials or combinations thereof. The media may include various structures that combine different materials, such as core and sheath structures, side-by-side structures, island in the sea structures, etc. The fibers may include a single material component, or two or more material components within a single fiber, including mixtures of materials. For example, the fibrous material may include one or more of cellulose; regenerated cellulose (e.g., rayon); synthetic materials such as polyamide, polyester, polyethersulfone (PES), polypropylene (PP), polyethylene (PE), polytetrafluoroethylene (PTFE), polyvinylidene difluoride (PVDF); glass; ceramic; or carbon fiber. In one embodiment, the filtration media used as the gas nucleation media is made of micro glass and synthetic fibers. Examples of suitable filtration media are described in U.S. Pat. Nos. 7,314,497; 7,309,372; 8,057,567; 8,268,033; 8,277,529; 8,512,435; 8,641,796; and 9,795,906, and U.S. Publication Nos. 2012/0234748 and 2017/0225105. The media may include various binders, such as acrylic, phenolic, or epoxy resins.

Preferably, the gas nucleation media has a suitable oleophilicity/oleophobicity to induce nucleation and to release formed gas cavities into the fluid flow (as opposed to being "trapped" onto the surface of the fibers). In one embodiment, the gas nucleation media is oleophobic. The oleophobic rating (oil repellency) of media may be measured according to AATCC method 118 (e.g., 118-2013), using KAYDOL white mineral oil from Sonnerborn LLC in Petrolia, PA Oleophobicity based on this test ranges from 0 to 8, with a rating of 0 meaning the media is not oleophobic. Oleophobic media has a rating of 1 or greater. The gas nucleation media may have an oleophobic rating of 1 or greater, 2 or greater, 3 or greater, 4 or greater, 5 or greater, or 6 or greater. The gas nucleation media may have an oleophobic rating of 8 or less, 7 or less, 6 or less, 5 or less, or 4 or less. In one embodiment, the gas nucleation media has an oleophobic rating of 2 to 8 or 3 to 8. Oleophobicity of a material may also be expressed as the contact angle of a drop of oil on a single fiber in air and may be measured by dispensing a bubble or oil drop onto fiber and measuring the contact angle, for example using a micro-contact-angle instrument (e.g., MCA-3 instrument available from Kyowa Interface Science Co., Ltd. in Niiza-City, Japan). The gas nucleation media may have an oil contact angle of at least 30°, at least 50°, at least 70°, at least 90°, or at least 120°. The gas nucleation media may have an oil contact angle of up to 120°, up to 150°.

The gas nucleation media may be inherently oleophobic (e.g., made of oleophobic fibers) and/or treated to become oleophobic using, for example, an oleophobic treatment compound. In general, oleophobic materials are fluorochemicals such as fluoropolymers with a high density of terminal CF3 pendent groups exposed at the surface. In certain embodiments, gas nucleation media, or oleophobic treatment compounds (e.g., fluorochemical treatment compounds) applied as surface coatings to the gas nucleation media, may be made from perfluoropolymers such as perfluoroacrylates, perfluorourethanes, perfluoroepoxies, perfluorosilicones, perfluoroalkanes, perfluorodioxolanes, or copolymers of these materials.

While gas nucleation media made from an inherently oleophobic material could be used, typically a fluorochemical treatment compound is coated on a conventional filtration media to make it oleophobic. The coating material could be, for example, an oleophobic polymer or another polymer that could be made oleophobic through a multiple step process. Typically, a fluorochemical treatment compound, dissolved or suspended in a liquid carrier (e.g., an organic solvent or water), is applied to a conventional filtration media by dipping or spraying. Alternatively, a coating could be applied through the vapor phase with a process such as Chemical Vapor Deposition (CVD).

Exemplary fluoropolymers include perfluoroacrylates dissolved in a solvent, such as those available under the trade names FLUOROPEL Series from Cytonix (Beltsville, MD), SRA 450 or SRA451 from 3M Company (Maplewood, MN), ADVAPEL 806 from Advanced Polymer Incorporated (Carlstadt, NJ); perfluorodioxolanes dissolved in a solvent, such as those available under the trade name TEFLON AF from Chemours (Wilmington, DE); perfluoroacrylate emulsions suspended in water, such as those available under the trade names UNIDYNE from Daikin (Orangeburg, NY), CAPSTONE from Chemours (Wilmington, DE), PHOBOL from Huntsman (The Woodlands, TX), or ADVAPEL 734 from Advanced Polymer Incorporated (Carlstadt, NJ); and perfluorourethanes suspended in water, such as that available under the trade name SRC220 from 3M Company (Maplewood, MN). The gas nucleation media could also be made oleophobic by applying a coating of a fluoropolymer through a plasma polymerization process, such as perfluoroacrylate coatings from P2i (Savannah, GA).

In certain embodiments, the gas nucleation media is prepared by applying a non-oleophobic coating to a conventional filtration media, and then modifying it to be oleophobic. For example, a polyalcohol polymer could be applied to a conventional filtration media and a perfluorosilane or a perfluoroacyl chloride grafted to this polymer. Alternatively, a polyamine could be applied to a conventional filtration media and a perfluoroacrylate grafted to this polymer.

The surface energy of a polymeric material may be determined by preparing a Zisman plot with appropriate fluids, for example according to ASTM D7490-13. The surface energy of materials may also be determined using the Owens-Wendt method. The fibers in the gas nucleation media may have a surface energy of 6 mJ/m$^2$ (millijoules per square meter) or greater, 10 mJ/m$^2$ or greater, 15 mJ/m$^2$ or greater, 20 mJ/m$^2$ or greater, or 40 mJ/m$^2$ or greater. The fibers in the gas nucleation media may have a surface energy of 400 mJ/m$^2$ or less, 300 mJ/m$^2$ or less, 200 mJ/m$^2$ or less, 150 mJ/m$^2$ or less, 100 mJ/m$^2$ or less, or 50 mJ/m$^2$ or less. For example, the fibers in the gas nucleation media may have a surface energy of 10 mJ/m$^2$ to 200 mJ/m$^2$. The values listed here are determined by ASTM D7490-13.

The geometric configuration of the fibers in the gas nucleation media may impact nucleation. For example, the presence of sharp edges or corners and surface roughness may improve nucleation. The configuration of fiber intersections, the angle of orientation of adjacent fibers, the orientation of the fiber surface relative to the direction of flow, and the tortuosity of the flow path may also impact nucleation. According to some embodiments, the gas nucleation media includes fibers with sharp edges or corners. For example, the fibers may have a cross section that does not have smooth shape (e.g., is not circular or oval). The fiber cross section may be polygonal or have an irregular shape with corners (e.g., corners of less than 180°, less than 120°, or less than 90°). The gas nucleation media includes fibers that have a circular, star-shaped, square, rectangular, trilobal, clover-shaped, or polygonal cross section. The cross section may be constant or varying throughout the length of the fiber.

Surface roughness of a material may be determined as the root mean square roughness using atomic force microscopy (AFM), cross section SEM or transmission electron microscopy (TEM), or surface profilometer. The measurement may be done on a fixed surface area, e.g., a square, having a dimension that is half of the fiber diameter. The fibers of the gas nucleation media may have a surface roughness of 1 nm or greater, 10 nm or greater, 25 nm or greater, 50 nm or greater, or 100 nm or greater. The fibers of the gas nucleation media may have a surface roughness of 1000 nm or less, 500 nm or less, or 200 nm or less. For example, the fibers of the gas nucleation media may have a surface roughness of 10 nm to 500 nm. The values listed here are determined by surface profilometer.

Surface roughness can also be characterized using various other parameters, such as skewness, kurtosis, etc. The surface features may exhibit a degree of asymmetry (for example, display more steep peaks or deep pits). The asymmetry may be expressed as skewness, measured using AFM, fiber cross section SEM, or a surface profilometer. The skewness of the fibers may be −10 or greater, −8 or greater, or −6 or greater. The skewness of the fibers may be 6 or less, 8 or less, or 10 or less. For example, the skewness of the fibers may be from −8 to 8. The values listed here are determined by surface profilometer.

Kurtosis is another measure of surface roughness that indicates the degree of pointedness of the sharp features. Kurtosis may be measured using AFM, fiber cross section SEM, or a surface profilometer. The fibers of the gas nucleation media may have a kurtosis of at least −10 or greater, −8 or greater, or −6 or greater. The fibers of the gas nucleation media may have a kurtosis of 6 or less, 8 or less, or 10 or less. For example, the kurtosis of the fibers may be from −8 to 8. Combinations of certain surface roughness, skewness, and kurtosis may result in favorable nucleation properties. For example, high roughness and high kurtosis may be beneficial to nucleation. The values listed here are determined by surface profilometer.

It is believed that to a certain extent, an increase in the number of fiber intersections may increase nucleation. A fiber intersection is understood to mean a contact point between two fibers. It is further believed that some ranges of angles of orientation of adjacent fibers and the orientation of fibers relative to the direction of flow may be beneficial to nucleation. For example, the fibers within the gas nucleation media may be randomly oriented such that a range of angles of orientation is achieved. In some embodiments, adjacent fibers within the gas nucleation media are not axially aligned with one another.

Aspects that influence the residence time of the fluid in the media or the differential pressure may also impact nucleation. For example, face velocity, media sheet solidity, media sheet permeability, thickness of media sheet, the Peclet number of dissolved gas from the fluid to the media (e.g., the ratio of advective transfer rate vs. diffusive transfer rate), tortuosity of the flow paths within the media, and orientation (e.g., angle) of the media sheet to the primary flow direction may have an impact on nucleation.

The face velocity of the fluid relative to the gas nucleation media sheet may be determined as the volumetric flow per bulk media surface area. The face velocity may be 0.01 cm/sec or greater, 0.1 cm/sec or greater, 0.5 cm/sec or greater, 1.0 cm/sec or greater, or 5.0 cm/sec or greater. There is not a desired upper limit to face velocity but, in practice, the face velocity may be 50 cm/sec or less, 20 cm/sec or less, or 10 cm/sec or less.

The solidity of a porous material is the ratio of the volume of the solids to the total volume of the porous material. The gas nucleation media sheet may have a solidity of 5% or greater, 10% or greater, or 20% or greater. The gas nucleation media sheet may have a solidity of 98% or less, 90% or less, 75% or less, 50% or less, 40% or less, or 30% or less.

Air permeability of a filter media is defined as the volume flow rate of air flow through a specified filter media area at a specified pressure drop. A method to measure air permeability is ASTM D737-04. The gas nucleation media sheet may have a permeability of 1 $ft^3/min/ft^2$ or greater at 0.5 inches of water (0.305 $m^3/min/m^2$ or greater at 125 Pa), 10 $ft^3/min/ft^2$ or greater at 0.5 inches of water (3.05 $m^3/min/m^2$ or greater at 125 Pa), or 50 $ft^3/min/ft^2$ or greater at 0.5 inches of water (15.2 $m^3/min/m^2$ or greater at 125 Pa). The gas nucleation media sheet may have a permeability of 500 $ft^3/min/ft^2$ or less at 0.5 inches of water (152 $m^3/min/m^2$ or less at 125 Pa), 400 $ft^3/min/ft^2$ or less at 0.5 inches of water (123 $m^3/min/m^2$ or less at 125 Pa), or 300 $ft^3/min/ft^2$ or less at 0.5 inches of water (91.4 $m^3/min/m^2$ or less at 125 Pa). For example, the gas nucleation media sheet may have a permeability of 0.5 $m^3/min/m^2$ to 100 $m^3/min/m^2$ at 125 Pa.

The gas nucleation media sheet may have an initial, clean differential pressure of 0.01 psi or less, 1 psi or less, or 100 psi or less, per ISO 16889 run at a suitable face velocity, for example at 0.5 cm/sec.

The Peclet number indicates the ratio of advective to diffusive transport rate of dissolved gas from the fluid to the media, calculated as length (e.g., fiber diameter) times velocity (e.g., face velocity) divided by diffusion coefficient. The gas nucleation media sheet may have a Peclet number of 0.05 or greater, 0.1 or greater, 0.5 or greater, 1 or greater, or 10 or greater. The gas nucleation media sheet may have a Peclet number of 1000 or less, 2500 or less, 10,000 or less, or 50,000 or less. For example, the gas nucleation media sheet may have a Peclet number of 0.5 to 10,000.

The angle of the fibers relative to the flow stream may be determined as a weight-average of angle of fibers relative to the direction of flow using, for example, CT (computer aided tomography) scan of the media. The angle may be 0° (degrees) or greater, 10° or greater, or 30° or greater. The angle may be 90° or less, 80° or less, or 60° or less. For example, the angle may be from 10° to 80°.

The rigidity of the fibers in the gas nucleation media may also have an impact on flow properties and thus may impact nucleation. Rigidity may be measured as the flexural modulus of the fibers or the base material, for example according to ASTM D790. For non-polymeric materials, the flexural modulus equals Young's modulus. The fibers of the gas nucleation media may have a flexural modulus of 1 GPa (gigapascal) or greater, 10 GPa or greater, or 50 GPa or greater. The fibers of the gas nucleation media may have a flexural modulus of 500 GPa or less, 400 GPa or less, or 250 GPa or less. For example, the fibers of the gas nucleation media may have a flexural modulus of 10 GPa to 400 GPa.

The gas nucleation media may have any suitable shape. The shape may be determined based on the positioning of the deaerator in the system. In one embodiment, the gas nucleation media defines a cylindrical shape. Thickness of a filter media sheet can be measured using a suitable caliper thickness gauge, such as one that uses a 2.87 cm diameter foot with an applied pressure of 1.5 psi. Thickness of a filter media sheet can be measured according to the TAPPI T411 test method. The gas nucleation media may have any suitable thickness. The thickness of the gas nucleation media may be measured in the direction of fluid flow. For example, in a cylindrical deaerator, the thickness of the gas nucleation media may be measured in a radial direction perpendicular to a center axis A. The gas nucleation media may have a thickness of 0.01 mm or greater, 0.1 mm or greater, or 0.5 mm or greater. The gas nucleation media may have a thickness of 5 mm or less, 2 mm or less, or 1 mm or less. For example, the gas nucleation media may have a thickness of 0.1 mm to 2 mm. The gas nucleation media may be either pleated or wrapped. In either case (pleated or wrapped), the media may have one layer or multiple layers. The media may be repeatedly wrapped or stacked. When multiple layers are included, the layers may have the same composition and/or structure of unique composition and/or structure that may be placed in intimate contact.

In some embodiments, the gas nucleation media includes filtration media. In one embodiment, the gas nucleation media is made of particulate filtration media. In some embodiments, the gas nucleation media has multiple layers. In some embodiments, the gas nucleation media is wrapped or stacked. In one embodiment, the gas nucleation media is made of pleated media. In one embodiment, the gas nucleation media is made of non-pleated media.

The growth media may be disposed adjacent to or immediately adjacent to the gas nucleation media. The growth media may be made of any suitable material that is capable of inducing coalescence and/or growth of gas cavities. Without wishing to be bound by theory, it is believed that multiple aspects of the growth media affect the effectiveness and efficiency of the media to induce coalescence. For example, aspects that influence coalescence may include chemical composition of the media (e.g., fibers and binder); surface energy of the media; media oleophilicity/oleophobicity; basis fiber surface area of the media; media sheet solidity; media mean pore; media max pore; media sheet permeability; thickness of media sheet; surface roughness; and differential pressure across the media. One or more of these properties may exhibit a gradient from the upstream side to the downstream side of the growth media. In some embodiments, the gas nucleation media may exhibit air bubble growth behavior. In such embodiments, a separate layer of growth media may be excluded. For example, gas nucleation media with a pore size of 4 μm or greater, 5 μm or greater, 6 μm or greater, or 8 μm or greater may exhibit air bubble growth behavior. In one embodiment, the gas nucleation media has a pore size of 4 μm or greater, 5 μm or greater, 6 μm or greater, or 8 μm or greater. In one such embodiment, the deaerator does not include growth media. In one embodiment, the deaerator comprises gas nucleation with a pore size of 5 μm or greater and does not include growth media.

The chemical composition of the growth media may impact coalescence and growth. The chemical composition of the growth media may include the chemical composition of fibers in the media and/or of any binders or other components used in the media. The fibers may include any suitable fibrous material, including woven or non-woven media made from one or more of cellulose; regenerated cellulose (e.g., rayon); synthetic materials such as polyamide (e.g., nylon), polyester, polyethersulfone (PES), polypropylene (PP), polyethylene (PE), polytetrafluoroethylene (PTFE), polyvinylidene difluoride (PVDF); glass; ceramic; or carbon fiber. In one embodiment, the growth media is made of or includes polyester, rayon, or a combination thereof. The media may include various binders, such as acrylic, phenolic, or epoxy resins.

Preferably, the growth media has a suitable surface energy and oleophilicity/oleophobicity to induce coalescence and/or growth of gas cavities and to release formed gas cavities into the fluid flow (as opposed to being "trapped" onto the surface of the fibers). According to an embodiment, the growth media is oleophilic. In some embodiments, the growth media exhibits an oleophilicity/oleophobicity gradient, where the upstream side of the media is more oleophobic than the downstream side. In another embodiment, the upstream side is more oleophilic than the downstream side. The oleophobic rating (oil repellency) of media may be measured according to AATCC method 118 (e.g., 118-2013). The growth media may have an oleophobic rating of 1 or greater, 2 or greater, 3 or greater, 4 or greater, 5 or greater, or 6 or greater. The growth media may have an oleophobic rating of 8 or less, 7 or less, 6 or less, 5 or less, or 4 or less. In one embodiment, the growth media has an oleophobic rating of 2 to 8 or 3 to 8. Oleophobicity of a material may also be expressed as the contact angle of a drop of oil on a single fiber in air. The growth media may have an oil contact angle of 0° or greater, 10° or greater, 20° or greater, or 30° or greater. The growth media may have an oil contact angle of 150° or less, 120° or less, 90° or less, or 60° or less. The growth media may be inherently oleophilic (e.g., made of oleophilic fibers) and/or treated to become oleophobic using, for example, an oleophobic treatment compound. The growth media may constructed from a composite material. The growth media may be a composite of oleophilic and oleophobic components. Oleophobic components have an oleophobic rating of 1 or greater.

The fibers in the growth media may have a surface energy of 6 mJ/m² or greater, 20 mJ/m² or greater, 50 mJ/m² or greater, 75 mJ/m² or greater, or 100 mJ/m² or greater. The fibers in the growth media may have a surface energy of 400 mJ/m² or less, 350 mJ/m² or less, 300 mJ/m² or less, or 250 mJ/m² or less. For example, the fibers in the growth media may have a surface energy of 20 mJ/m² to 350 mJ/m². The values listed here are determined by ASTM D7490-13.

The basis fiber surface area of the media and thus contact area between media and the fluid may impact coalescence and growth. The basis fiber surface area of the media is understood to mean the overall surface area (including surface area between fibers) in m² per bulk surface area of the media sheet in m². The basis fiber surface area of the growth media may be 1 m²/m² or greater, 1.5 m²/m² or greater, 1.6 m²/m² or greater, or 2 m²/m² or greater. The basis fiber surface area of the growth media may be up to 200 m²/m², up to 50 m²/m², up to 30 m²/m², up to 10 m²/m², up to 6 m²/m², or up to 4 m²/m². For example, the basis fiber surface area of the growth media may be 1.5 m²/m² to 50 m²/m². The values listed here are determined by the Carmen-Kozeny method.

The geometric configuration of the fibers in the growth media may impact coalescence and growth. For example, the presence of sharp edges or corners and surface roughness, the orientation of fiber surface relative to the direction of flow, the solidity, permeability, and pore size of the growth media may be selected to increase coalescence and growth of gas cavities and to release the gas cavities into the fluid flow after they have grown and/or coalesced.

The fiber cross section of fibers in the growth media may be polygonal or have an irregular shape with corners (e.g., corners of less than 180°, less than 120°, or less than 90°). The growth media may include fibers that have a circular, star-shaped, square, rectangular, tri-lobal, clover-shaped, or polygonal cross section. The cross section may be constant or varying throughout the length of the fiber.

The fiber size of fibers within the growth media may vary from fiber to fiber and along a given fiber. The fiber size may also vary from the upstream side of the media to the downstream side of the media along a gradient. The fibers within the growth media may have a fiber size of 10 nm or greater, 50 nm or greater, 100 nm or greater. The fibers within the growth media may have a fiber size of 500 μm or less, 100 μm or less, or 10 μm or less. For example, the fibers within the growth media may have a fiber size of 50 nm to 100 μm.

The angle of the fibers relative to the flow stream in the growth media may be 0° or greater, 10° or greater, or 30° or greater. The angle of the fibers in the growth media may be 90° or less, 80° or less, or 60° or less. For example, the angle may be from 10° to 80°.

The rigidity of the fibers in the growth media may also have an impact on flow properties and thus may impact coalescence and/or growth. The fibers of the growth media may have a flexural modulus of 1 GPa or greater, 10 GPa or greater, or 50 GPa or greater. The fibers of the growth media may have a flexural modulus of 500 GPa or less, 400 GPa or less, or 250 GPa or less. For example, the fibers of the growth media may have a flexural modulus of 10 GPa to 400 GPa.

The fibers within the growth media may have a surface roughness of 1 nm or greater, 10 nm or greater, 25 nm or greater, 50 nm or greater, or 100 nm or greater. The fibers within the growth media may have a surface roughness of 1000 nm or less, 500 nm or less, or 200 nm or less. For example, the fibers of the growth media may have a surface roughness of 10 nm to 500 nm. The fibers within the growth media may have skewness of −10 or greater, −8 or greater, or −6 or greater. The skewness of the fibers may be 6 or less, 8 or less, or 10 or less. For example, the skewness of the fibers may be from −8 to 8. The fibers within the growth media may have a kurtosis of 6 or less, 8 or less, or 10 or less. The values listed here are determined by surface profilometer.

Pores of the media are understood to mean holes (for example through holes) and cavities in the sheet of media. Pore size may be determined by ASTM F316-03 or ASTM D6767. Pores of the media may provide a flow path through the sheet of media for fluid. The growth media may have a mean pore size of 0.5 μm or greater, 1 μm or greater, or 5 μm or greater. The growth media may have a mean pore size of 5 μm or less, 10 μm or less, 20 μm or less, 100 μm or less, or 200 μm or less. For example, the pores within the growth media may have a mean pore size of 5 μm to 100 μm. The growth media may have a maximum pore size of 1 μm or greater, 5 μm or greater, or 10 μm or greater. The pores within the growth media may have a maximum pore size of 10 μm or less, 20 μm or less, 100 μm or less, or 200 μm or less. For example, the pores within the growth media may have a maximum pore size of 5 μm to 200 μm. The values listed here are determined by ASTM F316-03.

The growth media may have a solidity of 2% or greater, 4% or greater, 5% or greater, 6% or greater, 10% or greater, or 20% or greater, at 1.5 psi. The growth media may have a solidity of 90% or less, 75% or less, 50% or less, 40% or less, 30% or less, 20% or less, 15% or less, 10% or less, 9% or less, or 8% or less, at 1.5 psi. For example, the growth media may have a solidity of 2% to 20%, or 2% to 9%, at 1.5 psi. The growth media may include woven or nonwoven media with a porous structure.

The growth media sheet may have any suitable thickness. The thickness of the growth media impacts the differential pressure across the media sheet. The thickness of the growth media may be measured in the direction of fluid flow. For example, in a cylindrical deaerator, the growth media forms a coaxial cylinder at least partially surrounding the gas nucleation media and the thickness of the growth media may be measured in a radial direction perpendicular to a center axis A. Thickness of a filter media sheet can be measured using a suitable caliper thickness gauge, such as one that uses a 2.87 cm diameter foot with an applied pressure of 1.5 psi. Thickness of a filter media sheet can be measured according to the TAPPI T411 test method. The growth media may have a thickness of 0.01 mm or greater, 0.02 or greater, 0.05 or greater, 0.1 mm or greater, or 0.5 mm or greater, 0.8 mm or greater, 1 mm or greater, 2 mm or greater, 3 mm or greater, or 4 mm or greater. The growth media may have a thickness of 25 mm or less, 20 mm or less, 15 mm or less, or 10 mm or less. For example, the growth media may have a thickness of 0.1 mm to 20 mm or 0.8 mm to 10 mm.

The growth media sheet may have a differential pressure of 0.01 psi or less, 1 psi or less, or 100 psi or less, per ISO 16889 run at a suitable face velocity, for example at 0.5 cm/sec.

The growth media may be provided as a plurality of layers of media. The plurality of layers of media may be applied onto (e.g., wrapped around or laminated onto) the gas nucleation media. An increase in the number of layers of the growth media may improve the coalescing of gas cavities. However, an increase in the thickness of the growth media (e.g., due to an in the number of layers of media) may also increase the pressure drop across the growth media and the deaerator as a whole. Additionally, a high pressure drop may restrict the gas the nucleation stage is able to free, which results in nucleation later in the growth stage and smaller air bubbles released downstream of the growth stage. Therefore, the number of layers of the growth media may be balanced to provide improved coalescing without excessively increasing the pressure drop across the deaerator unit. The growth media may be provided as 2 or more, 3 or more, 4 or more, or 5 or more layers. The growth media may be provided as up to 20, up to 15, up to 12, or up to 10 layers. In embodiments where the growth media includes a plurality of layers, the thickness of the growth media may refer to the total thickness of the layers unless otherwise indicated. The thickness of the individual growth media sheet may influence how many wraps are used—for example a thinner media may utilize more wraps. In one embodiment, the growth media is made up of 5 to 10 layers (e.g., 7 layers) of media.

The porous barrier downstream of the growth media may include any suitable porous material defining openings or pores extending through the barrier. Without wishing to be bound by theory, it is believed that multiple aspects of the porous barrier affect the effectiveness and efficiency of the barrier. For example, aspects that influence the efficiency of the porous barrier may include pore size and pore shape, and regularity or uniformity of pore size and shape throughout the barrier; chemical composition of the barrier; oleophilicity/oleophobicity of the barrier; surface roughness or smoothness of the barrier; and the direction/orientation of the barrier relative to the direction of flow. One or more of these properties may be different on the upstream side than the downstream side or exhibit a gradient from the upstream side to the downstream side of the growth media.

In some embodiments, the porous barrier includes woven or nonwoven material. The openings may be uniformly sized or nonuniform, including openings of various sizes. The pores of the porous barrier may also be referred to as screen openings and are understood to mean holes (for example through holes) in the barrier. Pore size may be determined by ASTM E11 or by optical imaging. The porous barrier may include openings sized 5 µm or greater, 10 µm or greater, 15 µm or greater, or 20 µm or greater. The porous barrier may include openings sized 1 mm or smaller, 750 µm or smaller, 500 µm or smaller, 250 µm or smaller, 200 µm or smaller, 150 µm or smaller, or 100 µm or smaller. In one example, the porous barrier includes openings sized from 10 µm to 250 µm, from 15 µm to 200 µm, or from 20 µm to 150 µm. In some embodiments, the openings of the porous barrier are uniform in size (e.g., have a narrow pore size distribution). For example, in some embodiments, at least some openings, a majority of openings, at least 90% of openings, at least 95% of openings, or at least 99% of openings of the porous barrier are within the size ranges specified here, as determined by total opening area of the porous barrier. The values listed here are determined by optical imaging. In one embodiment, substantially all of the openings of the porous barrier are within the size ranges specified here.

The openings of the porous barrier may have any suitable shape. For example, the openings may be rectangular, square, round, oval, or any other suitable shape. The shape may be determined by viewing the porous barrier from a direction perpendicular to the plane of the porous barrier. In some embodiments, the openings of the porous barrier are uniform in shape. For example, in some embodiments, at least some openings, a majority of openings, at least 90% of openings, at least 95% of openings, or at least 99% of openings of the porous barrier have the same shape (e.g., are rectangular, square, round, oval, etc.).

The porous barrier 130 may be made of a woven or non-woven material. For example, the porous barrier 130 may be made of a woven mesh. The woven mesh may have a wire diameter (or cross dimension) of 0.01 mm or greater, 0.05 mm or greater, or 0.1 mm or greater. The woven mesh may have a wire diameter (or cross dimension) of 10 mm or less, 2 mm or less, 1 mm or less, or 0.5 mm or less. For example, the woven mesh may have a wire diameter (or cross dimension) of 0.05 mm to 2 mm. In one embodiment, the porous barrier 130 includes a pleated material, such as a pleated woven mesh. The porous barrier 130 may be made of any suitable material. For example, the porous barrier may be made of a material with suitable oleophilicity/oleophobicity to encourage further growth of gas cavities and to allow gas cavities to pass through the barrier. In some embodiments, the porous barrier or a part of the porous barrier is oleophobic. According to some embodiments, at least one side of the porous barrier is oleophilic. In some embodiments, the porous barrier exhibits an oleophobicity gradient, where the upstream side of the barrier is more oleophobic than the downstream side. Oleophobicity of a material may be expressed as an oleophobic rating measured according to AATCC method 118. The porous barrier may have an oleophobic rating of 1 or greater, 1.5 or greater, or 2 or greater. The porous barrier may have an oil rating of 8 or less or 6 or less. The porous barrier may constructed from a composite material. The porous barrier may be a composite of oleophilic and oleophobic components. Oleophobic components have an oleophobic rating of 1 or greater.

For example, the porous barrier 130 may be made of metal, such as stainless steel, or woven or non-woven media made from one or more of cellulose; regenerated cellulose (e.g., rayon); synthetic materials such as polyamide, polyester, polyethersulfone (PES), polypropylene (PP), polyethylene (PE), polytetrafluoroethylene (PTFE), polyvinylidene difluoride (PVDF); glass; ceramic; or carbon fiber. In one embodiment, the porous barrier 130 is made from a woven metallic mesh, such as stainless steel mesh. In some embodiments, the fibers (for example metallic fibers) are coated. Polymeric or non-polymeric coatings, such as resins, may be used. The porous barrier 130 may be arranged in a cylindrical shape at least partially surrounding the gas nucleation media 110 and the growth media 120.

The porous barrier may exhibit microtexture and macrotexture. Microtexture is used here to refer to the surface texture of the barrier at the level of individual fibers or wires that make up the barrier (e.g., referring to variations smaller than 1 mm in size). Microtexture may also be referred to as surface roughness. Macrotexture is used here to refer to the surface texture of the barrier overall (e.g., referring to variations greater than 1 mm in size). The porous barrier may exhibit surface roughness. For example, porous barrier may have a surface roughness of 1 nm or greater, 10 nm or greater, 25 nm or greater, 50 nm or greater, or 100 nm or greater. The porous barrier may have a surface roughness of 1000 nm or less, 500 nm or less, or 200 nm or less. For example, the porous barrier may have a surface roughness of 10 nm to 500 nm. In some embodiments, the porous barrier has little or no macrotexture, i.e., the porous barrier is "smooth," with the exception that the porous barrier may be pleated.

Additional characterizations for the porous barrier surface include skewness, kurtosis, and radius of curvature. The skewness of the fibers may be at least –10 or greater, –8 or greater, or –6 or greater. The skewness of the fibers may be 6 or less, 8 or less, or 10 or less. The fibers of the porous barrier may have a kurtosis of –10 or greater, –8 or greater, or –6 or greater. The fibers of the porous barrier may have a kurtosis of 6 or less, 8 or less, or 10 or less. Combinations of certain surface roughness, skewness, and kurtosis may result in favorable capture properties. For example, high roughness and high kurtosis may be beneficial to capture. The fibers of the porous barrier may have a radius of curvature may be up to 2 nm, up to 5 nm, up to 10, up to 50, up to 100, or up to 500 nm.

The porous barrier may have an initial, clean differential pressure of 0.01 psi or less, 1 psi or less, or 100 psi or less, per ISO 16889 run at a suitable face velocity, for example at 0.5 cm/sec.

The porous barrier may be positioned generally perpendicular to the direction of flow. For example, the porous barrier may be cylindrical with a cylindrical wall that is coaxial with the nucleation media. In some embodiments, the porous barrier includes pleated material, where the faces of the pleats are angled relative to the direction of flow. The deaerator 100 may include a gap 135 between the gas nucleation media 110 and the porous barrier 130, or between the growth media 120 and the porous barrier 130 as shown. The gap 135 may be suitably sized to accommodate coalesced gas cavities (second stage gas cavities) from the growth media 120. The gap 135 may be arranged to allow the coalesced gas cavities (second stage gas cavities) to gather and to further coalesce (third stage gas cavities). Thus, the gap 135 may in some respects be considered a second growth stage.

The porous barrier 130 may have an axial length that is equal to the axial length of the gas nucleation media 110. Alternatively, the porous barrier 130 may have an axial length that is greater than or shorter than the axial length of the gas nucleation media 110. In one embodiment, the axial length of the porous barrier 130 is shorter than the axial length of the gas nucleation media 110.

The gap 135 may extend in an axial direction from the first end cap 141 to the second end cap 142, defining an axial length of the gap 135. The gap 135 may have a width measured as the radial distance between the gas nucleation media 110 and the porous barrier 130, or between the growth media 120 and the porous barrier 130. In some embodiments, the gap 135 extends from the growth media 120 to the wall of the tank. The gap 135 may be evenly sized along its axial length or may be wider at one end than the other. For example, the gap 135 may be constructed to be wider at its bottom and narrower at the top, or narrower at the bottom and wider at the top. The gap 135 may have a width of 0.5 mm or greater, 1 mm or greater, 1.5 mm or greater, 2 mm or greater, 2.5 mm or greater, or 4 mm or greater. The width of the gap 135 may be 25 mm or less, 20 mm or less, 15 mm or less, 10 mm or less, or 5 mm or less. For example, the gap may have a width of 4 mm to 20 mm. In some embodiments where the gap 135 extends from the growth media 120 to the wall of the tank, the size of the gap may be larger, e.g., up to 10 m (meters), up to 5 m, up to 1 m, up to 50 cm (centimeters), up to 25 cm, or up to 10 cm.

The deaerator 100 may include additional elements. For example, the deaerator 100 may include one or more support liners. Such liners may be disposed adjacent or between the gas nucleation media 110, the growth media 120, and/or the porous barrier 130, or any combination thereof. The deaerator 100 may further include one or more of housing elements, support elements, mounting elements, end caps, seals, potting compound, tubes, lines, and the like.

The deaerator 100 may include removable and/or serviceable parts. For example, one or more of the gas nucleation media 110, the growth media 120, and the porous barrier 130 may be independently removable and/or serviceable or may form a removable and/or serviceable unit. In one embodiment, the gas nucleation media 110 and the growth media 120 are removable and/or serviceable. For example, the gas nucleation media 110 and the growth media 120 may form a removable and/or serviceable unit. The serviceable unit of the gas nucleation media 110 and the growth media 120 may optionally include separate end caps attached to the gas nucleation media 110 and the growth media 120. The porous barrier 130 may be permanently attached to the first end cap 141 and/or the second end cap 142. The porous barrier 130 and the first end cap 141 and/or the second end cap 142 may form a frame. In some embodiments, the serviceable unit of the gas nucleation media 110 and the growth media 120 may removably and sealingly couple with the frame. When the deaerator 100 is assembled, the end caps of the serviceable unit of the gas nucleation media 110 and the growth media 120 may be adjacent the first and second end caps 141, 142 and may include a seal, such as an O-ring, between adjacent end caps. Adjacent end caps may be axially aligned with one or more of the end caps including a lip that limits movement of an adjacent end cap.

The deaerator 100 is configured so that it can be mounted in a variety of orientations, for example with the central axis A directed vertically as show, or alternatively with the central axis A directed horizontally. A horizontal orientation may be advantageous if the deaerator 100 is mounted in-line, such as at return line 31. In a horizontal orientation, the gas nucleation media 110, growth media 120, and the porous barrier 130 may be arranged in a non-cylindrical shape, such as in a planar shape.

In a preferred embodiment, the deaerator 100 is positioned inside the tank 10 in a vertical position (where the axis A is vertical or substantially vertical). The deaerator 100 may be disposed below (e.g., directly below) an inlet into the tank 10. For example, the deaerator 100 may be mounted onto the inlet where return line 31 discharges fluid into the tank 10. The deaerator 100 may be submerged or partially submerged or may, at least at times, be completely above the fluid level of the tank. For example, the tank 10 may be a hydraulic fluid tank of a hydraulic system, where fluid level in the tank 10 varies during operation of the hydraulic system. The deaerator 100 may be mounted at or near the top of the tank such that the deaerator 100 is partially submerged in the hydraulic fluid at times, at least some of the time, or all the time.

A list of various aspects of the deaerator of the present disclosure is provided below.

According to a first aspect, a deaerator comprises: gas nucleation media; growth media adjacent the gas nucleation media; and a porous barrier adjacent the growth media.

In aspect 2, the deaerator of aspect 1 further comprises a gap between the growth media and the porous barrier. The gap may have a width of 0.5 mm or greater, 1 mm or greater, 1.5 mm or greater, 2 mm or greater, or 2.5 mm or greater; or 50 cm or less, 20 cm or less, 25 mm or less, 20 mm or less, 15 mm or less, 10 mm or less, or 5 mm or less. The gap may have a width of 1 mm to 15 mm.

In aspect 3, according to the deaerator of aspect 1 or aspect 2, the gas nucleation media comprises particulate filtration media.

In aspect 4, according to the deaerator of any one of aspects 1-3, the gas nucleation media comprises cellulose, regenerated cellulose, polyamide, polyester, polyether-sulfone (PES), polypropylene (PP), polyethylene (PE), poly-tetrafluoroethylene (PTFE), polyvinylidene difluoride (PVDF), glass, ceramic, carbon fiber, or a combination thereof. The gas nucleation media may comprise a combination of glass fibers and polyester.

In aspect 5, according to the deaerator of any one of aspects 1-4, the gas nucleation media comprises oleophobic material having an oil contact angle of at least 30°, at least 50°, at least 70°, at least 90°, or at least 120°; or up to 120°, or up to 150°. The gas nucleation media may have an oil contact angle of 50° to 120°.

In aspect 6, according to the deaerator of any one of aspects 1-5, the gas nucleation media comprises oleophobic material having an oleophobic rating of 1 or greater, 2 or greater, 3 or greater, 4 or greater, 5 or greater, or 6 or greater; or 8 or less, 7 or less, 6 or less, 5 or less, or 4 or less. The gas nucleation media may have an oleophobic rating of 2 to 8 or 3 to 8.

In aspect 7, according to the deaerator of any one of aspects 1-6, the growth media comprises a plurality of layers of media. The growth media may comprise 2 or more, 3 or more, 4 or more, or 5 or more layers; or as up to 20, up to 15, up to 12, or up to 10 layers. The growth media may comprise 2 to 15 layers or 4 10 layers. The growth media may comprise 7 layers.

In aspect 8, according to the deaerator of any one of aspects 1-7, the growth media is immediately adjacent the gas nucleation media.

In aspect 9, according to the deaerator of any one of aspects 1-8, the growth media comprises cellulose, regenerated cellulose, polyamide, polyester, polyethersulfone (PES), polypropylene (PP), polyethylene (PE), polytetrafluoroethylene (PTFE), polyvinylidene difluoride (PVDF), glass, ceramic, carbon fiber, or a combination thereof. The growth media may comprise a combination of regenerated cellulose fibers and polyester.

In aspect 10, according to the deaerator of any one of aspects 1-9, the porous barrier comprises openings forming an outlet.

In aspect 11, according to the deaerator of any one of aspects 1-10, the porous barrier comprises openings sized 1 mm or smaller, 750 μm or smaller, 500 μm or smaller, 250 μm or smaller, 200 μm or smaller, 150 μm or smaller, or 100 μm or smaller. The porous barrier may include openings sized from 10 μm to 120 μm, from 15 μm to 100 μm, or from 20 μm to 80 μm.

In aspect 12, according to the deaerator of aspect 11 further comprises a liner.

In aspect 13, according to the deaerator of any one of aspects 1-12 further comprising a first end cap comprising an opening defining an inlet.

In aspect 14, according to the deaerator of any one of aspects 1-13 further comprising a closed second end cap.

In aspect 15, according to the deaerator of aspect 14, the second end cap comprises a bottom.

In aspect 16, according to the deaerator of any one of aspects 1-15, the gas nucleation media surrounds and defines an open deaerator interior.

In aspect 17, according to the deaerator of any one of aspects 1-16, the gas nucleation media, the growth media, and the porous barrier form a cylindrical body.

In aspect 18, according to the deaerator of any one of aspects 1-17, the gas nucleation media has a basis fiber surface area of 1 $m^2/m^2$ or greater, 1.5 $m^2/m^2$ or greater, 2 $m^2/m^2$ of media or greater, 5 $m^2/m^2$ of media or greater, 10 $m^2/m^2$ of media or greater, 25 $m^2/m^2$ or greater, 50 $m^2/m^2$ or greater, or 100 $m^2/m^2$ or greater; or 200 $m^2/m^2$ or less, 150 $m^2/m^2$ or less, 100 $m^2/m^2$ or less, 50 $m^2/m^2$ or less, 30 $m^2/m^2$ or less, 10 $m^2/m^2$ or less, 6 $m^2/m^2$ or less, or 4 $m^2/m^2$ or less as measured by the Carmen-Kozeny method. The gas nucleation media may have a basis fiber surface area of 1 $m^2/m^2$ to 100 $m^2/m^2$ or 5 $m^2/m^2$ to 50 $m^2/m^2$ as measured by the Carmen-Kozeny method.

In aspect 19, according to the deaerator of any one of aspects 1-18, the gas nucleation media has a mean pore size of 0.5 μm or greater, 1 μm or greater, or 5 μm or greater; or 5 μm or less, 10 μm or less, 20 μm or less, 100 μm or less, or 200 μm or less, as measured by ASTM F316. The pores within the gas nucleation media may have a mean pore size of 5 μm to 100 μm or 30 μm or less, as measured by ASTM F316.

In aspect 20, according to the deaerator of aspect 13, the first end cap comprises an inlet directly into a gap between the growth media and the porous barrier.

In aspect 21, according to the deaerator of any one of aspects 1-20, the growth media has a solidity of 2% or greater, 4% or greater, 5% or greater, 6% or greater, 10% or greater, or 20% or greater; or 90% or less, 75% or less, 50% or less, 40% or less, 30% or less, 20% or less, 15% or less, 10% or less, 9% or less, or 8% or less, at 1.5 psi. The growth media may have a solidity of 2% to 20%, or 2% to 9%, at 1.5 psi.

In aspect 22, according to the deaerator of any one of aspects 1-21, the growth media has a thickness of 0.01 mm or greater, 0.02 or greater, 0.05 or greater, 0.1 mm or greater, or 0.5 mm or greater, 0.8 mm or greater, 1 mm or greater, 2 mm or greater, 3 mm or greater, or 4 mm or greater; or 25 mm or less, 20 mm or less, 15 mm or less, or 10 mm or less, measured according to the TAPPI T411 test method. The growth media may have a thickness of 0.1 mm to 20 mm or 0.8 mm to 10 mm, measured according to the TAPPI T411 test method.

In aspect 23, according to the deaerator of any one of aspects 1-22, the growth media comprises a composite of oleophilic components and oleophobic components, wherein an oleophobic component has an oleophobic rating of 1 or greater as measured by AATCC method 118.

In aspect 24, according to the deaerator of any one of aspects 1-23, the porous barrier comprises an oleophobic surface with an oleophobic rating of 1 or greater as measured by AATCC method 118.

In aspect 25, according to the deaerator of any one of aspects 1-24, the porous barrier comprises a composite of oleophilic components and oleophobic components, wherein an oleophobic component has an oleophobic rating of 1 or greater as measured by AATCC method 118.

According to aspect 26, a system for removing gas from a fluid comprises: a tank comprising a fluid inlet and a fluid outlet and having a fluid flow path from the fluid inlet to the fluid outlet; and a deaerator in the fluid flow path.

In aspect 27, according to the system of aspect 26, the deaerator comprises: gas nucleation media; growth media downstream of the gas nucleation media; and a porous barrier downstream of the gas nucleation media.

In aspect 28, according to the system of aspect 26 or 27, the deaerator comprises a gap between the growth media and the porous barrier.

In aspect 29, according to the system of any one of aspects 26-28, the gas nucleation media comprises particulate filtration media.

In aspect 30, according to the system of any one of aspects 26-29, the gas nucleation media comprises cellulose, regenerated cellulose, polyamide, polyester, polyethersulfone (PES), polypropylene (PP), polyethylene (PE), polytetrafluoroethylene (PTFE), polyvinylidene difluoride (PVDF), glass, or a combination thereof. The gas nucleation media may comprise a combination of glass fibers and polyester.

In aspect 31, according to the system of any one of aspects 26-30, the gas nucleation media comprises oleophobic material having an oil contact angle of at least 30°, at least 50°, at least 70°, at least 90°, or at least 120°; or up to 120°, or up to 150°. The gas nucleation media may have an oil contact angle of 50° to 120°.

In aspect 32, according to the system of any one of aspects 26-31, the gas nucleation media comprises oleophobic material having an oleophobic rating of 1 or greater, 2 or greater, 3 or greater, 4 or greater, 5 or greater, or 6 or greater; or 8 or less, 7 or less, 6 or less, 5 or less, or 4 or less. The gas nucleation media may have an oleophobic rating of 2 to 8 or 3 to 8.

In aspect 33, according to the system of any one of aspects 26-32, the growth media comprises a plurality of layers of media. The growth media may comprise 2 or more, 3 or more, 4 or more, or 5 or more layers; or as up to 20, up to 15, up to 12, or up to 10 layers. The growth media may comprise 2 to 15 layers or 4 10 layers. The growth media may comprise 7 layers.

In aspect 34, according to the system of any one of aspects 26-33, the growth media comprises cellulose, regenerated cellulose, polyamide, polyester, polyethersulfone (PES), polypropylene (PP), polyethylene (PE), polytetrafluoroethylene (PTFE), polyvinylidene difluoride (PVDF), glass, ceramic, carbon fiber, or a combination thereof. The growth media may comprise a combination of regenerated cellulose fibers and polyester.

In aspect 35, according to the system of any one of aspects 26-34, the growth media is immediately adjacent the gas nucleation media.

In aspect 36, according to the system of any one of aspects 26-35, the porous barrier comprises openings sized 1 mm or smaller, 750 µm or smaller, 500 µm or smaller, 250 µm or smaller, 200 µm or smaller, 150 µm or smaller, or 100 µm or smaller. The porous barrier may include openings sized from 10 µm to 250 µm, from 15 µm to 200 µm, or from 20 µm to 150 µm.

In aspect 37, according to the system of any one of aspects 26-36, the deaerator comprises a liner.

In aspect 38, according to the system of any one of aspects 26-37, the deaerator comprises a first end cap comprising an opening defining a deaerator inlet.

In aspect 39, according to the system of any one of aspects 26-38, the deaerator comprises a closed second end cap.

In aspect 40, according to the system of any one of aspects 26-39, the closed second end cap comprises a bottom.

In aspect 41, according to the system of any one of aspects 26-40, the gas nucleation media surrounds and defines an open deaerator interior.

In aspect 42, according to the system of any one of aspects 26-41, the gas nucleation media, the growth media, and the porous barrier form a cylindrical body.

In aspect 43, according to the system of any one of aspects 26-42, the gas nucleation media and the growth media are disposed in the fluid flow path in a through flow configuration.

According to aspect 44, a method for removing gas from a fluid comprises: passing the fluid through a deaerator defining a fluid flow path, the deaerator comprising the deaerator of any one of aspects 1-25. The fluid may comprise an oil. The fluid may comprise a hydraulic fluid.

In aspect 45, according to the method of aspect 44, the method comprises removing at least 25%, at least 30%, at least 35%, at least 40%, at least 45%, at least 50%, at least 55%, or at least 60% of air in the fluid compared to a baseline of no deaerator.

According to aspect 46, a deaerator comprises: gas nucleation media; a porous barrier adjacent the growth media, the porous barrier comprising openings sized 1 mm or smaller, 750 µm or smaller, 500 µm or smaller, 250 µm or smaller, 200 µm or smaller, 150 µm or smaller, or 100 µm or smaller; and a gap between the gas nucleation media and the porous barrier. The porous barrier may include openings sized from 10 µm to 120 µm, from 15 µm to 100 µm, or from 20 µm to 80 µm.

In aspect 47, according to the deaerator of aspect 46, the gas nucleation media comprises particulate filtration media.

In aspect 48, according to the deaerator of aspect 46 or 47, the gas nucleation media comprises cellulose, regenerated cellulose, polyamide, polyester, polyethersulfone (PES), polypropylene (PP), polyethylene (PE), polytetrafluoroethylene (PTFE), polyvinylidene difluoride (PVDF), glass, ceramic, carbon fiber, or a combination thereof. The gas nucleation media may comprise a combination of glass fibers and polyester.

In aspect 49, according to the deaerator of any one of aspects 46-48, the gas nucleation media comprises oleophobic material having an oil contact angle of at least 30°, at least 50°, at least 70°, at least 90°, or at least 120°; or up to 120°, or up to 150°. The gas nucleation media may have an oil contact angle of 50° to 120°.

In aspect 50, according to the deaerator of any one of aspects 46-49, the gas nucleation media comprises oleophobic material having an oleophobic rating of 1 or greater, 2 or greater, 3 or greater, 4 or greater, 5 or greater, or 6 or greater; or 8 or less, 7 or less, 6 or less, 5 or less, or 4 or less. The gas nucleation media may have an oleophobic rating of 2 to 8 or 3 to 8.

In aspect 51, according to the deaerator of any one of aspects 46-50, the gap is 0.5 mm or greater, 1 mm or greater, 1.5 mm or greater, 2 mm or greater, 2.5 mm or greater, or 4 mm or greater; or 25 mm or less, 20 mm or less, 15 mm or less, 10 mm or less, or 5 mm or less. The gap may be from 4 mm to 20 mm.

In aspect 52, the deaerator of any one of aspects 46-51 further comprises a liner.

In aspect 53, the deaerator of any one of aspects 46-52 further comprises a first end cap comprising an opening defining an inlet.

In aspect 54, the deaerator of any one of aspects 46-53 further comprises a closed second end cap.

In aspect 55, according to the deaerator of any one of aspects 46-54, the gas nucleation media surrounds and defines an open deaerator interior.

In aspect 56, according to the deaerator of any one of aspects 46-55, the gas nucleation media and the porous barrier form a cylindrical body.

In aspect 57, according to the deaerator of any one of aspects 46-56, the gas nucleation media has a mean pore size of 0.5 μm or greater, 1 μm or greater, or 5 μm or greater; or 5 μm or less, 10 μm or less, 20 μm or less, 100 μm or less, or 200 μm or less, as measured by ASTM F316. The pores within the gas nucleation media may have a mean pore size of 5 μm to 100 μm or 30 μm or less, as measured by ASTM F316.

EXAMPLES

Examples 1 and 2

Various aspects of deaerators configured for use with hydraulic oil were tested. Deaerator performance was tested against a commercially available deaerator and a baseline that included no deaerator.

Test system. For testing the performance of a deaerator, hydraulic oil was saturated with air using pressurized air. The tests were performed using HY-GARD™ Hydraulic/Transmission Oil available from Deere & Company in Moline, IL The deaerators were assembled in a tank constructed to simulate the hydraulic oil tank in a hydraulic system, where return hydraulic oil enters the tank and the deaerator from the top. During testing, the tank was at ambient pressure. The air-saturated oil was circulated through the system including the deaerator tank housing the deaerator being tested. The air-saturated oil was pumped to the deaerator to determine the air removal efficiency.

The fluid was heated to a target temperature such as 35±1.6° C. and the flow rate was about 36 L/min at a pressure of 414 kPa. Air was flowed into the aeration tanks at 7.1 L/min.

Preparation of samples. Deaeration filter elements (Samples C-H) were built in a coaxial fashion as shown in FIG. 2A with a gap of 0.5 cm between the growth media and the screen barrier. Elements were sized to target a media face velocity per each stage: 30 cm/min for the nucleation stage, 130 cm/min for the growth stage and 30 cm/min for the screen-barrier stage. Nucleation media was pleated EN0799037 Hydraulic media available from Donaldson Company, Inc. in Minneapolis, MN, used in part number P171846 & P171579. Growth media was wrapped needle-punched polyester/rayon blend nonwoven media, such as PN-130 (130 g/m$^2$) as manufactured by Precision Custom Coatings, LLC (Totowa, NJ). Screen-barrier consisted of pleated simple-weave screen. The nucleation media and the screen barrier were supported with supports wires.

The commercially available deaerator (comparative example, Sample A) was downsized to match the flow capacity of the test system. In the commercially available deaerator, flow enters through the bottom, turns and passes through a particulate media radially outward from inside to outside. The particulate media is surrounded by a cylindrical metal shell (downstream of the particulate media). The cylindrical metal shell has rectangular openings in the lower ⅓ of the shell with a single layer of stainless steel screen affixed to the inside of the openings so that all flow travels through the screen. The screen was estimated to have openings of about 2 mm. It was observed that all small bubbles and many large bubbles traveled through the screen without coalescing. The screen provided an outward and slightly upward flow through the rectangular openings.

The baseline (Sample B) included only a particle filter and no deaerator. The particle filter used as the baseline was the K041774 filter available from Donaldson Company, Inc. in Minneapolis, MN.

Figure 4:
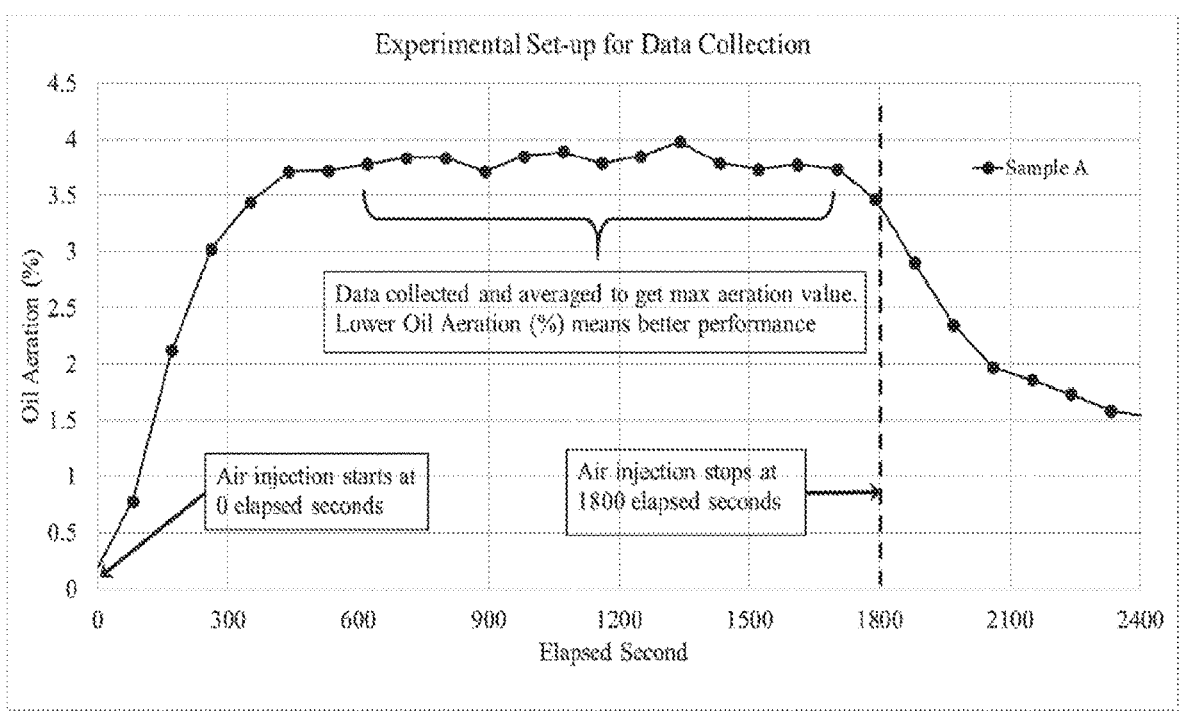
FIG. 4 is a graphical representation of a data gathering set-up used in the Examples.

Test method. Hydraulic oil fed into the tank was continuously aerated for 1800 seconds. Oil aeration (%) was measured and recorded throughout the test. A schematic of the data gathering set-up used in Examples 1 and 2 is shown in FIG. 4. A maximum aeration value for each deaerator was determined by averaging the oil aeration (%) readings from 600 s to 1700 s. A lower maximum aeration value indicates more air removed and thus better deaeration performance. The samples were tested against the commercially available deaerator designated "Sample A" and the baseline that included no deaerator, designated "Sample B."

The aeration measurement device was the AIR-X sensor from Delta Services Industriels in Froyennes, Belgium.

Example 1

Sample devices were prepared with varying mesh opening sizes of the porous barrier while maintaining the nucleation stage and the growth stage constant. The growth media was prepared with 7 layers (wraps) of the media. The nominal mesh opening sizes of Samples C-F ranged from 20 μm to 125 μm as shown in TABLE 1 below. The deaerators were tested as described above. The results, including pressure differential across the deaerator, are also shown in TABLE 1 and in FIGS. 5A-5C.

TABLE 1

| Sample | Description | Differential Pressure (PSID) | Max. Avg. Aeration (%) | Aeration Compared with Baseline | Air Reduction from Baseline |
|---|---|---|---|---|---|
| Sample A | Commercially Available | 7 | 3.7 | 96% | 4% |
| Sample B | Baseline | 9.5 | 3.9 | 100% | N/A |
| Sample C | 20 μm screen, nylon | 10.5 | 1.5 | 39% | 61% |
| Sample D | 50 μm screen, stainless steel | 11.5 | 3.0 | 78% | 22% |
| Sample E | 80 μm screen, stainless steel | 11 | 3.3 | 85% | 15% |
| Sample F | 125 μm screen, stainless steel | 12 | 3.3 | 85% | 15% |

Figure 5A:
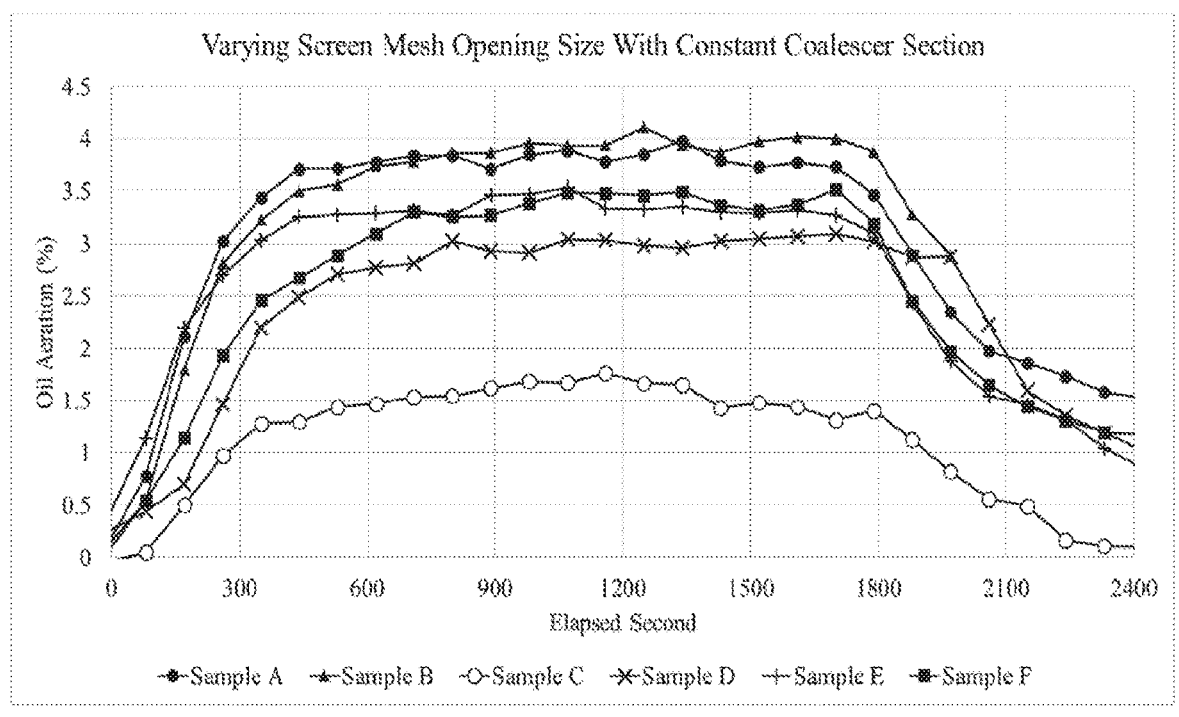
FIGS. 5A-5C are graphical representations of results from Example 1.
Figure 5B:
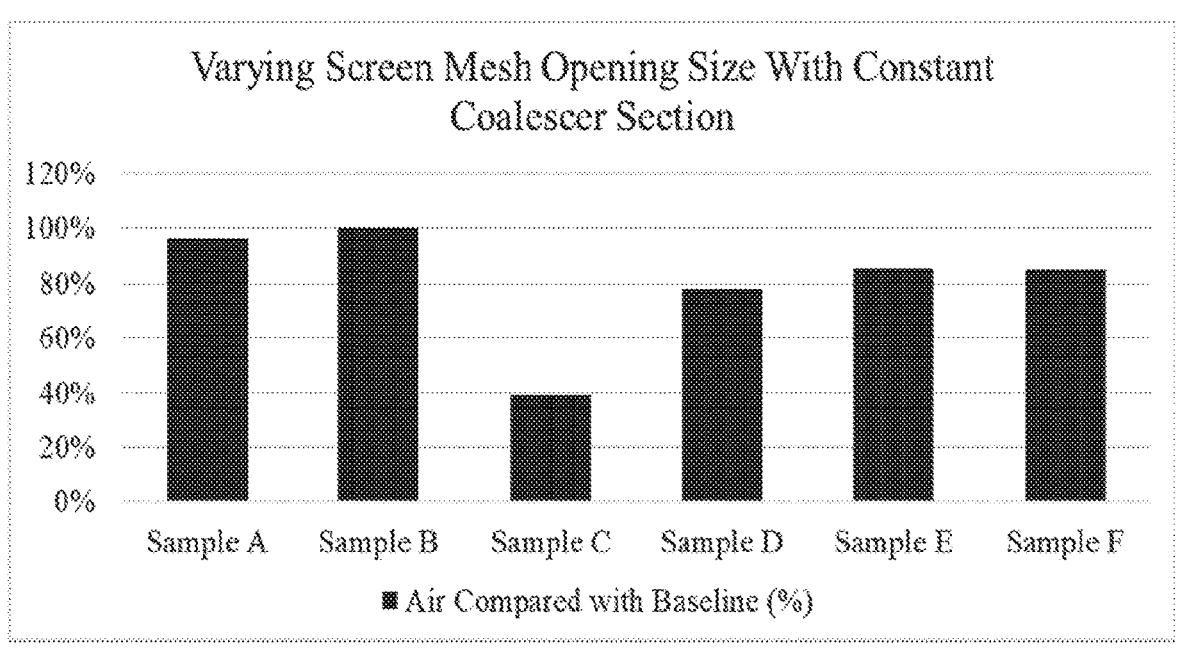
Figure 5C:
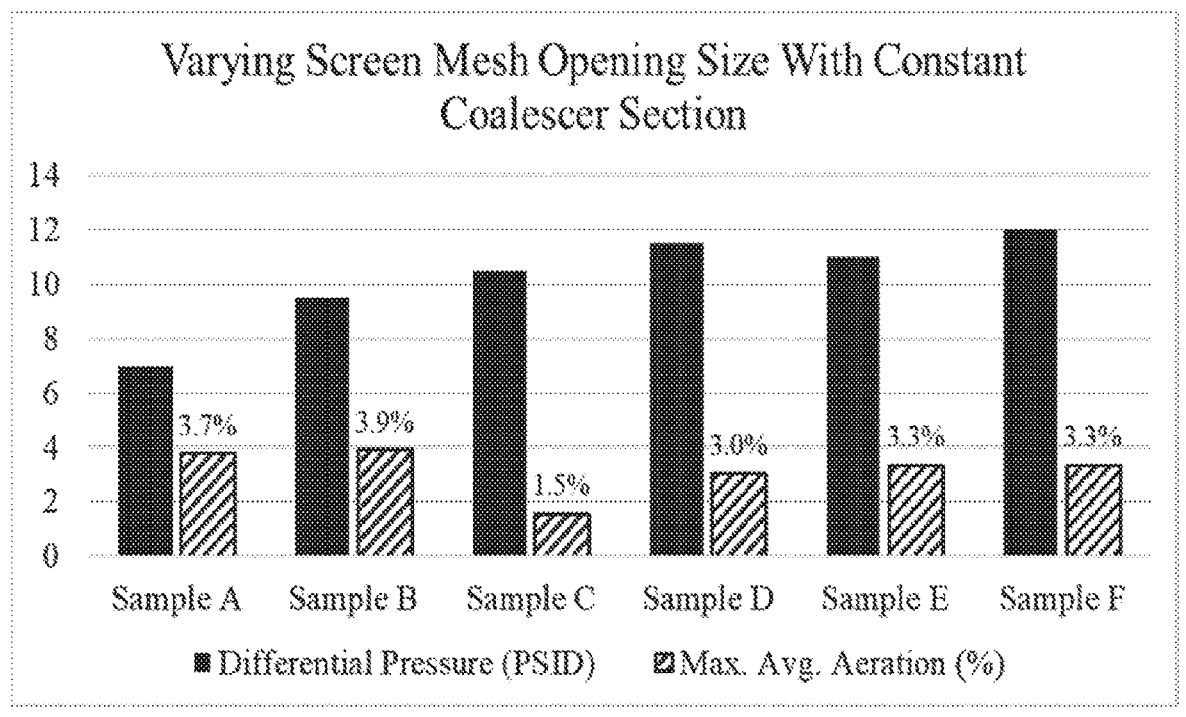

FIG. 5A is a data plot of the oil aeration (%) results of the various samples. The improvement in the maximum average aeration (%) over the baseline Sample B is shown in FIG. 5B. It was observed that a smaller mesh opening size of the porous barrier produced better deaeration results than larger sizes. The reduction in maximum average aeration of Sample C was 61%, compared with 22% for Sample D, and 15% for Samples E and F. It was further observed that each of the samples C-F outperformed the commercially available Sample A and the baseline Sample B. The maximum average aeration (%) and pressure differential are contrasted in FIG. 5C.

Example 2

Sample devices C, G, and H were prepared with varying growth media thicknesses by applying a varying number of layers of growth media, while maintaining the nucleation media and the mesh opening size of the porous barrier constant. Sample C had the same thickness of growth media as in Example 1 (7 layers of media), Sample G had half the thickness of growth media (3 layers of media), and Sample H had no growth media as shown in TABLE 2 below. The deaerators were tested as described above. The results, including pressure differential across the deaerator, are also shown in TABLE 2 and in FIGS. 6A-6C.

TABLE 2

| Sample | Description | Differential Pressure (PSID) | Max. Avg. Aeration | Aeration Compared with Baseline | Air Reduction from Baseline |
|---|---|---|---|---|---|
| Sample A | Commercially Available | 7 | 3.7% | 96% | 4% |
| Sample B | Baseline | 9.5 | 3.9% | 100% | N/A |
| Sample C | Growth and 20 μm nylon screen | 10.5 | 1.5% | 39% | 61% |
| Sample G | Half thickness growth and 20 μm nylon screen | 11.5 | 3.0% | 54% | 46% |
| Sample H | No growth and 20 μm nylon screen | 11 | 3.3% | 73% | 27% |

Figure 6A:
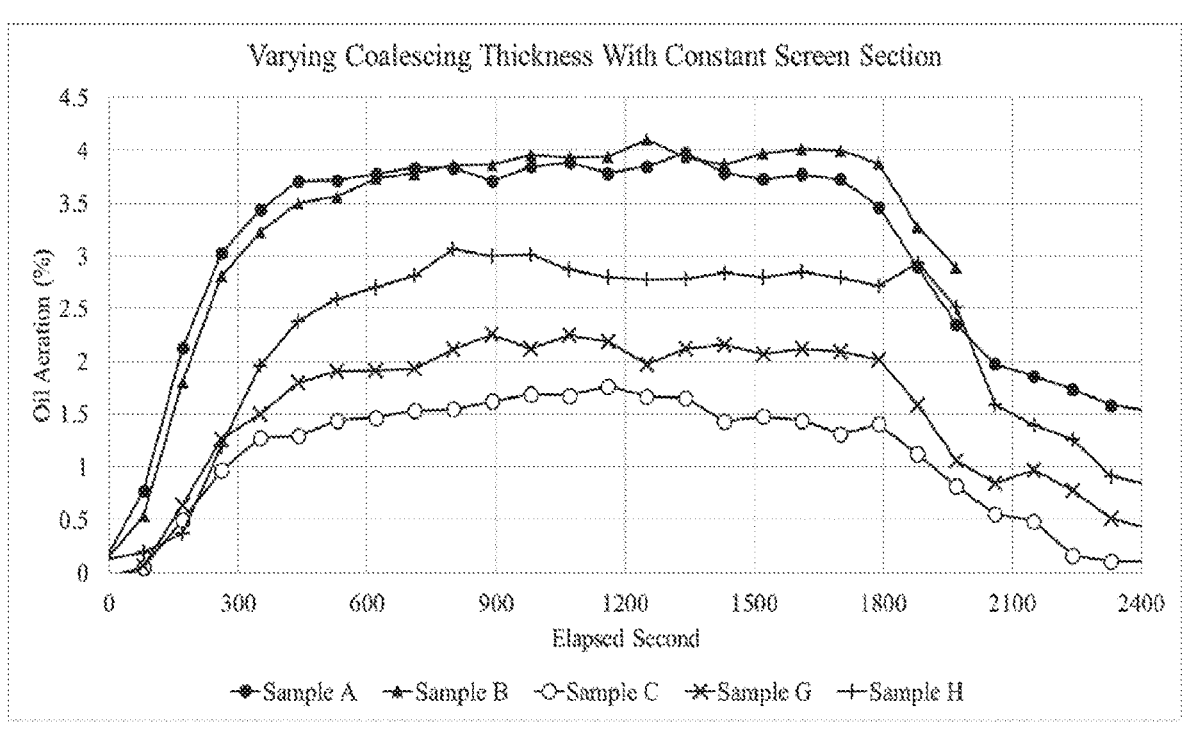
FIGS. 6A-6C are graphical representations of results from Example 2.
Figure 6B:
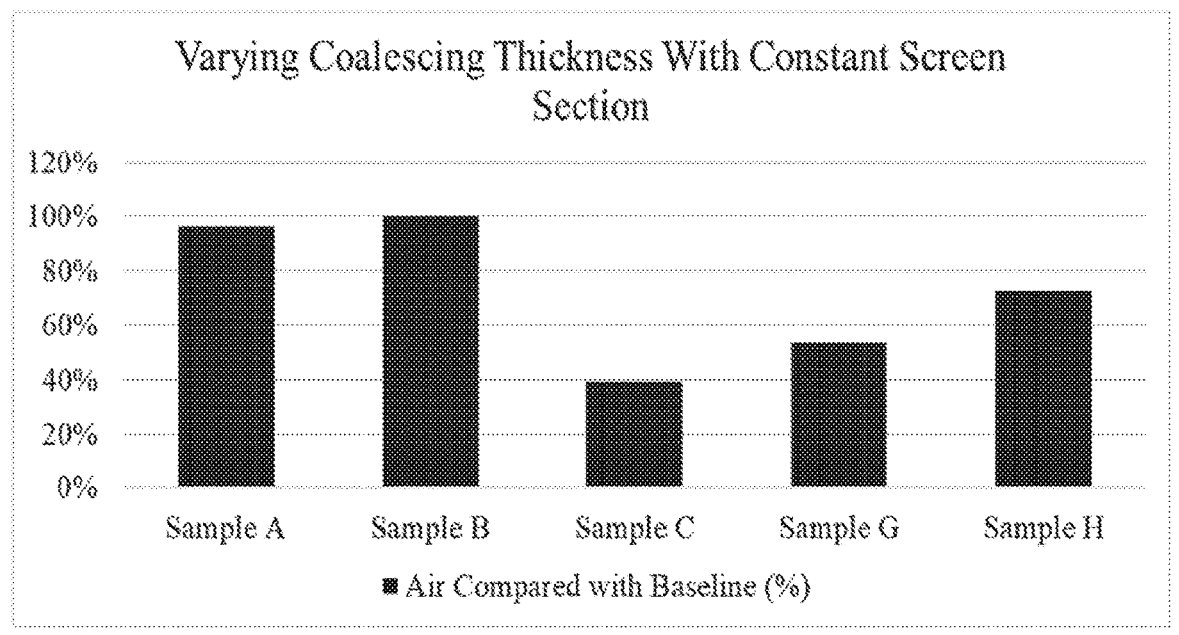
Figure 6C:
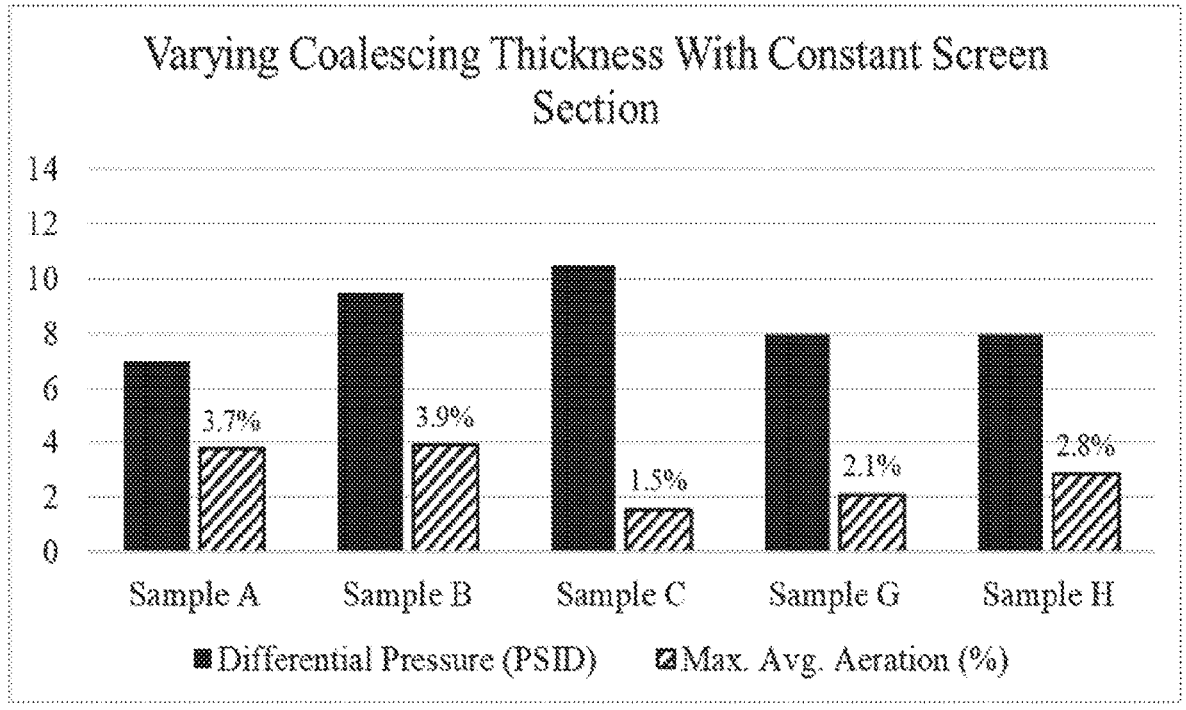
Figure 7A:
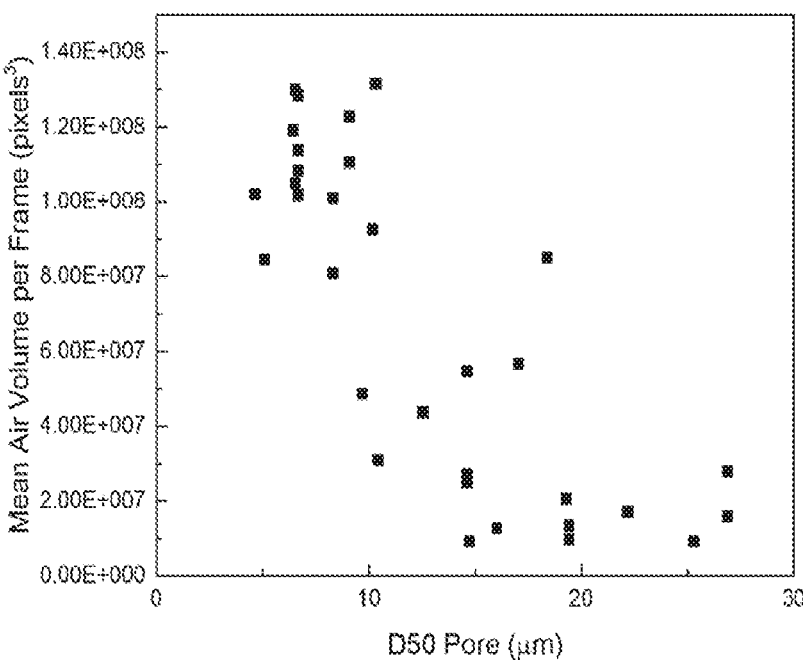
FIGS. 7A-7D and 8A-8D are graphical representations of results from Example 3.
Figure 7B:
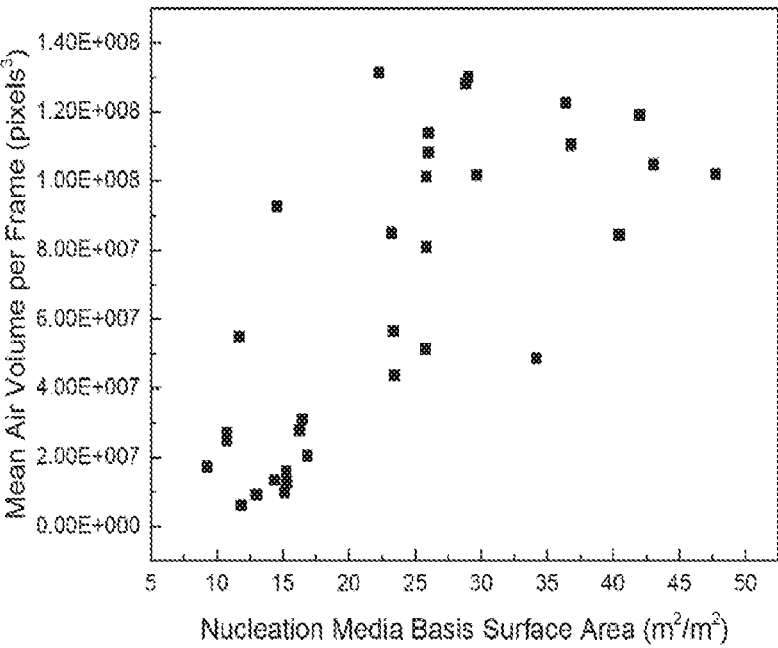
Figure 7C:
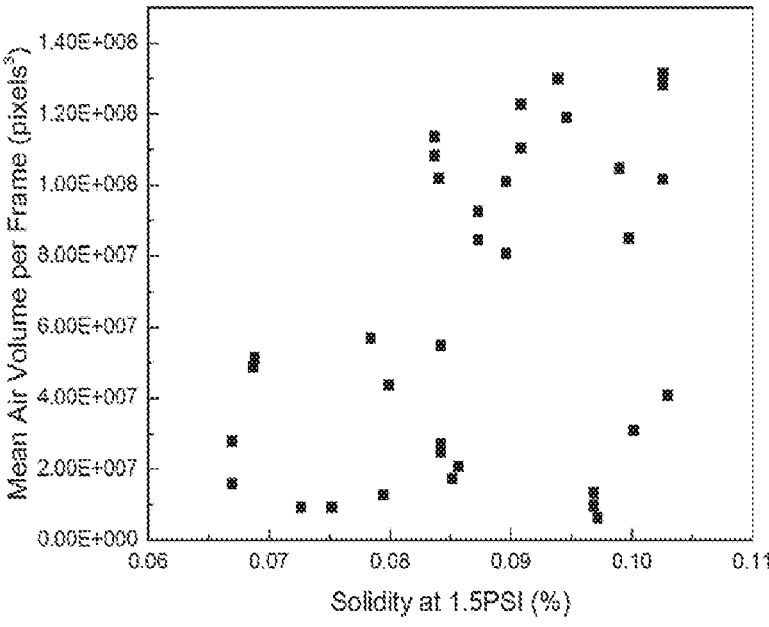
Figure 7D:
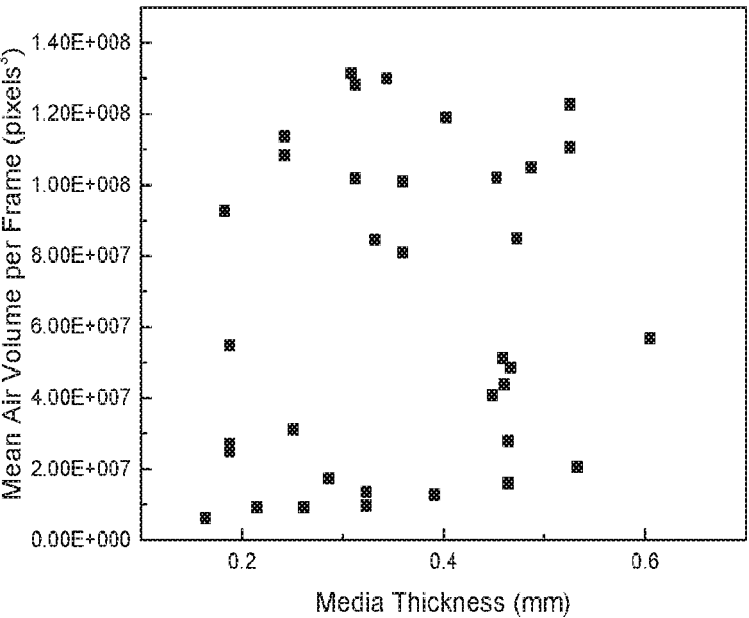
Figure 8A:
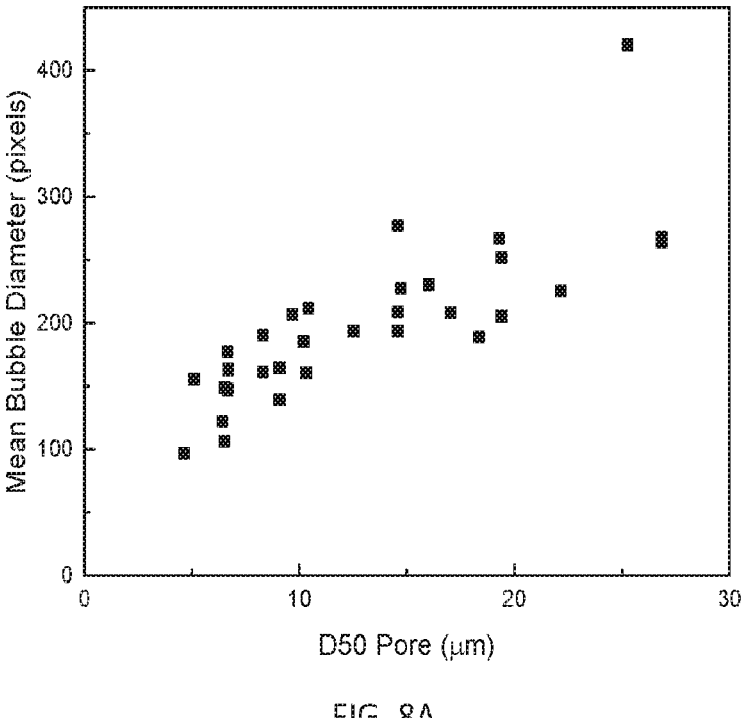
Figure 8B:
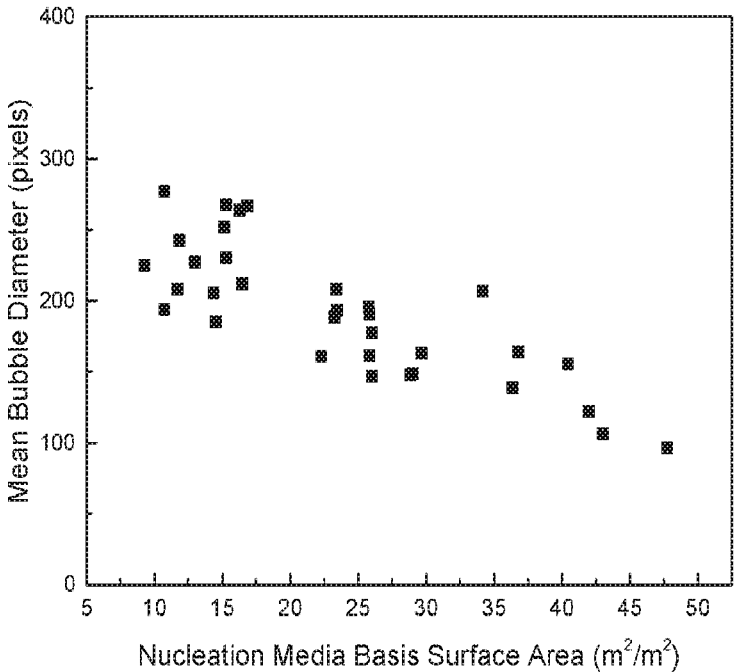
Figure 8C:
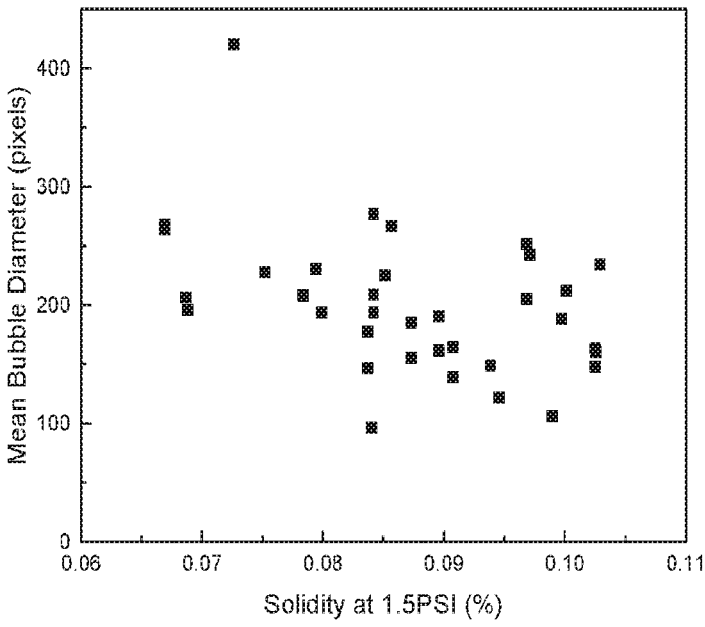
Figure 8D:
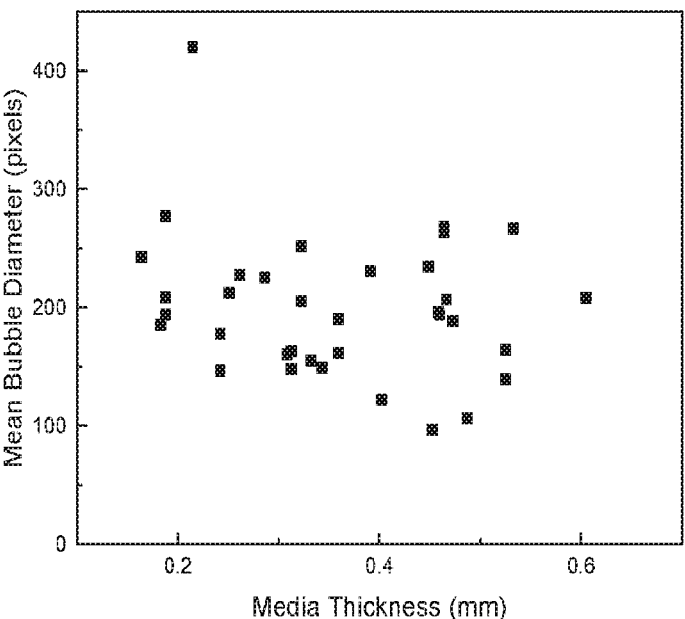

FIG. 6A is a data plot of the oil aeration (%) results of the various samples. The improvement in the maximum average aeration (%) over the baseline Sample B is shown in FIG. 6B. It was observed that thicker growth media produced better deaeration results. The reduction in maximum average aeration of Sample C was 61% of the baseline, while Sample G achieved 46% reduction and Sample H 27% reduction in maximum average aeration. It was further observed that each of the samples C, G, and H outperformed the commercially available Sample A and the baseline Sample B. The maximum average aeration (%) and pressure differential are contrasted in FIG. 6C.

Examples 3-5

Preparation of samples. Media handsheets were produced by dispersing the fibers in water, and then formed in an ADIRONDACK FORMAX 12"×12" stainless steel sheet mold available from Adirondack Machine Corp. in Hudson Falls, NY The specific details of the furnish are provided in Example 3 below. The tested media was cut to fit the media holder, with an effective area of 71 mm². The test media was soaked in test oil and placed in an in-line media housing.

The term "basis fiber surface area" is used here to refer to the surface area of fibers per bulk media surface area.

Surface area analysis. The surface area of the media can be determined by Branauer-Emmett-Teller (BET) analysis or from the Carmen-Kozeny relation. Examples 3 and 4 used the Carmen-Kozeny relation.

BET analysis: the basis fiber surface area of media in m² per bulk surface area in 1 m² of a media sample can be determined from the surface area per unit mass using ISO 9277 and media dry basis weight as determined by ASTM D646 by the relation:

$$\text{basis fiber surface area} = \frac{\text{fiber surface area}}{\text{mass of fibers}} * \text{basis weight}$$

For low surface area materials (e.g., fiber surface area is less than 1 m²/g), the BET measurement is preferably performed using krypton gas. For high surface area materials (e.g., fiber surface area is greater than 1 m²/g), the BET measurement is preferably performed using nitrogen gas. If the basis fiber surface area is measured only of a single layer of a media composite, the layer is removed from the composite and the mass and basis weight of the layer are used in the calculation.

Carmen-Kozeny method: the basis fiber surface area of the media may be calculated based on the Carmen-Kozeny relation, in which the pressure drop of a fluid flowing through a solid porous material is calculated based on an equation derived by combining Darcy's Law and Poiseuille's Law when modeling the fluid flow through a packed bed of spheres. The general form of the equation is $$\Delta P = Lv\frac{180\mu}{\phi^2 d^2}\frac{(1-\epsilon)^2}{\epsilon^3},$$

which can be manipulated into:

$$d = \sqrt{\frac{Lv}{\Delta P}\frac{180\mu}{\phi^2}\frac{(1-\epsilon)^2}{\epsilon^3}},$$

where d=Nominal diameter of cylinders that make up the porous structure (sometimes referred to as the nominal fiber diameter size)
ΔP=Pressure drop across the packed porous bed
L=Length of the porous bed
v=Directional velocity of the fluid through the porous bed
μ=Viscosity of the fluid
ε=Porosity of the porous bed
φ=Shape factor of the spherical particles. Shape factor of φ=1 was used.

Because the fibers used in most typical filtration media, including the examples here, have large aspect ratios of 100-1000, the surface area of the ends can be considered negligible, and the surface area of the fiber may be considered as the surface area of one long fiber or cylinder. The basis fiber surface area of the media can then be calculated based on the total mass of a filter media sample and the density of the material. In the case that the fiber made from more than one material, mass fraction weighted density is used. The identification of fiber materials and their mass fractions can be determined by methods known to those skilled in the art. The surface area is reported as basis fiber surface area per the Carmen-Kozeny method. If the basis fiber surface area is measured only of a single layer of a media composite, the layer is removed from the composite before testing.

Test procedure. In order to test the performance of nucleation media, a nucleation test bench was constructed from a tank connected to an air supply through a series of valves and plumbing. The air supplied to the tank was controlled by two different pressure control valves to maintain a specific pressure within the tank. The tank was connected to a media test housing, which also incorporated a bypass loop. Both the housing tubing and bypass lead to a CANTYVISION camera and then to a collection flask positioned atop a digital mass scale. Images obtained from the CANTYVISION camera video recordings were analyzed using CANTYVISION Intelligent Analysis software to both record and analyze the nucleation capabilities of the media sheet being tested. The CANTYVISION camera and software are available from JM Canty, Inc. in Buffalo, NY.

At the start of the test, the tank was filled with test oil, about 1.5 gallons. An air flow loop was created through the tank to aerate the hydraulic oil through bubbling. Tank pressure was maintained at 25 psi to aerate the oil. After the oil was aerated, excess free air was allowed to escape from the oil.

To perform the nucleation test, aerated hydraulic oil from the tank was flown through the test media while adjusting tank pressure to drive flow at a desired experimental face velocity, observed by logging data from the scale. The test was run for 7 minutes. The flow of oil was imaged using the CANTYVISION camera at 5 frames per second, and the data was processed using the CANTYVISION software to calculate mean air volume per video frame, and mean bubble diameter.

Image Data Processing. Image processing was performed using the IMAGEJ software (available from the U.S. Dept. of Health and Human Services, National Institutes of Health). The following routine was applied uniformly across all experiments, to the last 1000 frames captured per experiment.

The images were cropped, if necessary, to an area which excluded any artifacts of the experiment such as the window walls and circular objects which are not air bubbles. The images were converted into 8-bit greyscale images. The "Otsu" auto threshold algorithm (described in Otsu, N., A Threshold Selection Method from Gray-Level Histograms, 9 IEEE Transactions on Systems, Man, and Cybernetics 62 (1979)) was applied to convert the images into black and white images, where black is set as the background color. Unfilled object outlines in the images were filled using the "Fill holes" routine, after which the "Watershed" routine (described in Soille, P. and Vincent, L., "Determining Watersheds in Digital Pictures via Flooding Simulations" 1360 Proc. SPIE 240 (1990)) was applied to detect and divide overlapping objects. These processed images were then used to count the bubbles which are at least 1203 $\mu m^2$ in area and 0.95 in roundness (defined as $4*area/[\pi*major\_axis^2]$). The bubble volume was estimated from the Feret diameter of the bubbles. A Feret diameter is defined as the longest distance between any two points along the selection boundary (also known as maximum caliper). In the nucleation stage, the term "bubble diameter" refers to the Feret diameter.

Pore size measurement. The pore size of media may be measured using an automated air permeability porometer, such as those manufactured by Porous Materials, Inc. in Ithaca, NY In these examples, Porous Materials model number APP-1200-AEXSC was used with CAPWIN software. The test type was capillary flow porometry, dry up/wet up, the test fluid was silicone fluid with a fluid surface tension of 20.1 dynes/cm, and the sample effective testing size was 1 cm in diameter.

Example 3

Various nucleation media samples were tested in a single-layer arrangement. The media samples were prepared from micro glass fibers and sheath/core bi-component polyester according to TABLE 3 below. The bi-component polyester fiber was ADVANSA 271P, available from Advansa GmbH in Germany, and had a nominal mean diameter of 14 μm and a nominal mean length of 6 mm. Various drying techniques, including oven and sheet dryer, and compression were used to create varying thickness and solidity in the samples. Air flow ovens are known to create lower solidity structures than sheet dryers.

TABLE 3

| Furnish Design Factors of Media Samples | | | | |
|---|---|---|---|---|
| Target Basis Weight (g/m²) | | | | |
| 30 | 42 | 60 | 78 | 90 |
| Mass Ratio of Glass (%) | | | | |
| 20 | 26 | 40 | 54 | 60 |
| Glass Microfiber Nominal Diameter | | | | |
| 1.0 μm (UNIFRAX Grade B-10-F) | | 1.48 μm (UNIFRAX Grade B-15-F) | | 2.44 μm (UNIFRAX Grade B-26-R) |
| Drying Procedures | | | | |
| Forced air oven | | Hot plate drier | | Hot plate drier, then heated compression with 40 kg weight. |

The tested media properties are shown in TABLE 4.

TABLE 4

| Properties of Media Samples | | |
|---|---|---|
| Media Property | Minimum Value | Maximum Value |
| Mean Pore Size | 4.6 μm | 26.9 μm |
| Basis Fiber Surface Area | 9.2 m²/m² | 47.8 m²/m² |
| Media Thickness | 0.1638 mm | 0.6051 mm |
| Media Solidity Measured at 1.5 psi | 6.7% | 10.3% |

The mean air volume per frame (proportional to total air released) and mean bubble diameter were determined as a function of mean pore size, basis fiber surface area, media solidity measured at 1.5 psi and media thickness. The basis fiber surface area was determined by the Carmen-Kozeny method. Parameters that showed a trend are shown in the figures. The data comparing mean air volume per frame to mean pore size, total nucleation surface area, media solidity measured at 1.5 psi, and media thickness are shown in FIGS. 7A-7D. The data comparing mean bubble diameter to mean pore size, basis fiber surface area, media solidity measured at 1.5 psi, and media thickness are shown in FIGS. 8A-8D.

An ANOVA analysis was performed to determine the most important regressors for mean air volume per frame. Based on this analysis, more air is released with an increase in basis fiber surface area and a smaller mean pore size. A similar ANOVA analysis was performed to determine the most important regressors for mean bubble diameter. Based on this analysis the mean bubble diameter increases with a larger mean pore size. The mean bubble diameter decreases with an increase in basis fiber surface area.

Example 4

In another example, a media sample from Example 3 was stacked into a multi-layer media sample. Media properties of the media sample used for layering are shown in TABLE 5. The multi-layer media sample contained between 1 and 8 media samples.

TABLE 5

Properties of Individual Media Sample
used to Prepare Layered Sample

| Media Property | Value |
|---|---|
| Basis Weight | 28.9 g/m² |
| Percentage Glass (Mass Percentage) | 40% |
| Glass Microfiber Nominal Diameter | 1.48 μm (Unifrax Glass Microfiber Grade B-15-F) |
| Thickness | 0.1638 mm |
| Solidity at 1.5 psi | 9.7% |
| Basis Fiber Surface Area | 15.6 m²/m² |
| Permeability Average | 32.4 m³/min/m² at 125Pa |

Figure 9A:
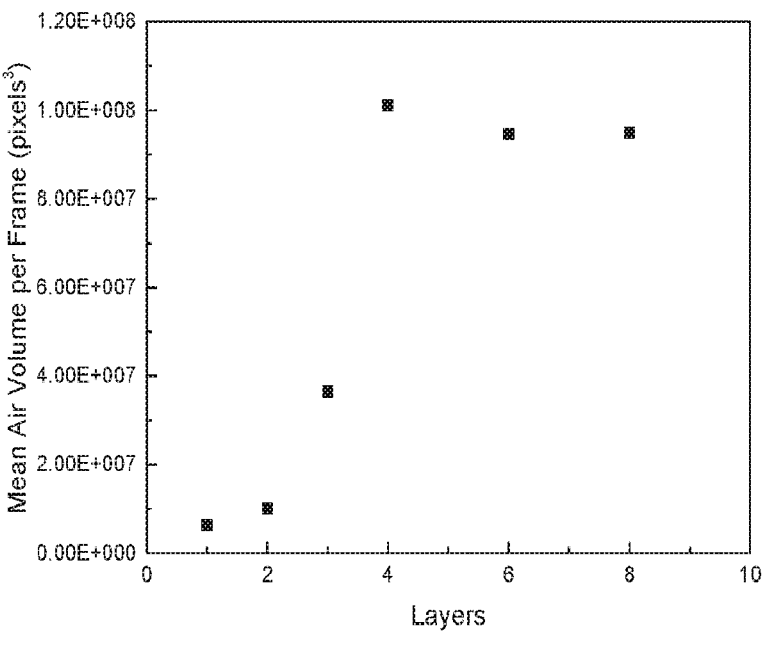
FIGS. 9A and 9B are graphical representations of results from Example 4.
Figure 9B:
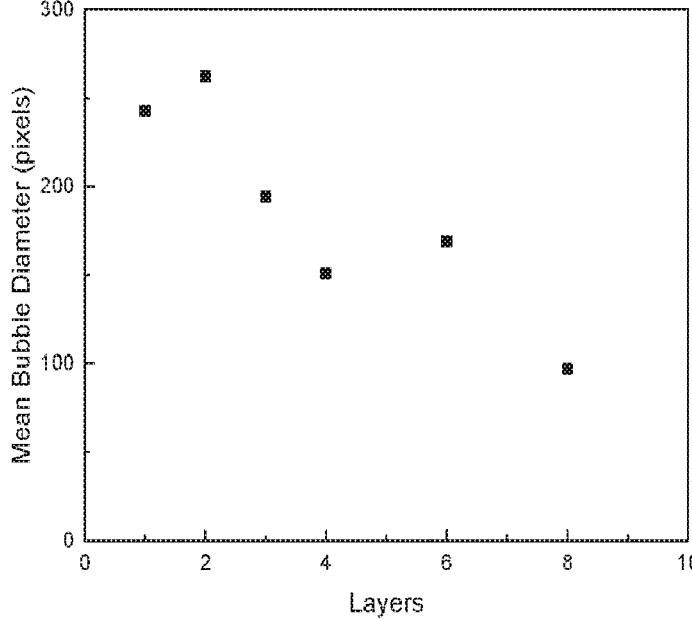

The mean air volume per frame (proportional to total air released) and mean bubble diameter were determined as a function of number of layers. The mean air volume per frame as a function of layers is shown in FIG. 9A. The mean bubble size as a function of layers is shown in FIG. 9B. It was observed that initially the number of layers increases the mean air volume per frame increases and the mean bubble size decreases. At a higher number of layers the mean air volume per frame levels off while the mean bubble size continues to decrease.

Example 5

In another example, a media handsheet was produced by a wet laid process by dispersing 200 mg of a sheath/core bi-component polyester fiber with a nominal mean diameter of 14 μm and a nominal mean length of 6 mm (ADVANSA 271P) in water, and then formed on a 90 mm diameter circular stainless steel sheet mold. The dried media handsheet patches were fused at 115° C.

A sample of the media handsheet was coated to be oleophobic. The oleophobic coating was applied by hand dipping screen swatches into an aqueous 5% solution of DAIKIN UNIDYNE TG-5502, obtained from Daikin America Inc. in Orangeburg, NY Samples were dried in an oven for 10 minutes at 120° C. Oleophobic treated media had an oleophobic rating of at least 6 as tested by AATCC method 118.

The nucleation performance of the oleophobic coated media was compared to un-coated media as in Examples 3 and 4. The mean air generation rate was calculated by adding up the volume of all individual bubbles over the experiment and dividing by the length of the experiment in seconds.

The results are shown in TABLE 6. It was observed that the oleophobic treatment increased the air generation rate and total air released. The mean bubble diameter decreased after the oleophobic treatment.

TABLE 6

Nucleation Performance of Oleophobic
Media and Control (Uncoated) Media.

| | Mean Air Generation Rate (mm³/s) | Mean Bubble Diameter (μm) |
|---|---|---|
| Control (Uncoated) | 0.52 | 378 |
| Oleophobic | 7.44 | 209 |

Example 6

Various aspects of the growth layer were tested in Example 6.

Preparation of samples. Media handsheets were produced by dispersing the fibers in water, and then formed in an ADIRONDACK FORMAX 12"×12" stainless steel sheet mold available from Adirondack Machine Corp. in Hudson Falls, NY The specific details of the furnish are provided in TABLE 7 below. The tested media was cut to fit the media holder, with an effective area of 12.9 cm². The test media was placed in an in-line media housing.

Test procedure. In order to test the performance of growth media, a test bench was constructed and used to challenge media samples with small air bubbles (nominal mean diameter 600 μm) in oil and monitor the ability of the media to grow the air bubbles. The bench was constructed to be capable of monitoring the size and count of the bubbles both upstream and downstream of the test media sample.

The test bench included an oil storage tank, a gear pump to adjust oil flow from the tank, pressure gauges, and a line connecting the oil storage tank to a test cell. A flow meter placed in the line was used to determine the face velocity of the oil at the media within the test cell. An air bubble injection fitting was mounted inline immediately before the test cell. The air injection was controlled by a series of flowmeters and pressure regulators to create a consistent bubble challenge upstream of the test media. The test cell was constructed of clear acrylic to allow for image capture on both the upstream side and downstream side of the test media. A return line lead from the test cell back to the oil storage tank. A Nikon D90 camera was mounted on a vertical sliding rail and used to capture image sequences on both upstream and downstream side of the test media.

To run the test, the oil flow was first started, and once oil had filled the test cell, the air bubble injector was turned on. After reaching a steady state, a sequence of images was captured on both upstream and downstream side of the test media. After a period of time, the image capture was repeated.

Image Data Processing. The images were processed similar to Examples 3 and 4 (nucleation stage) across all experiments (20 frames per experiment), up to and including application of the "Watershed" routine. The processed images were then used to count the bubbles which are at least 10,000 μm² in area (23.42 μm/pixel) and 0.5 in circularity (defined as $4\pi*area/perimeter^2$). The bubble volume was calculated from the bubble area using the following condition: if the Feret diameter of the bubble is greater than 3 mm, the diameter is estimated from the bubble area as follows:

$$Volume = \pi/(7.5*10^8)*([Area]/\pi)^{(3/2)}$$

Otherwise, if the Feret diameter is lower than or equal to 3 mm, the diameter is taken to be the Feret diameter and the bubble volume is calculated as a typical sphere.

The difference in calculation methods is due to the fact that visual inspection of bubbles larger than about 3 mm suggested that the large bubbles were, in fact, clusters of bubbles, which gave an artificially large volume when calculated with Feret diameter.

Data Analysis. A growth performance parameter D50 was used to evaluate performance. D50 is defined as the calculated median air bubble volume, that is, 50% of the number of bubbles are below this size.

$$\text{Percentage increase in } D50 \ (\%) = \frac{D50_{Downstream} - D50_{Upstream}}{D50_{Upstream}}$$

Performance percentage increase in D50 of 0% is interpreted as no performance gain. Below 0% is interpreted as poor performance in bubble growth, and above 0% is interpreted as an improvement in the bubble growth.

Testing and Results. Various growth media samples were tested to evaluate the effect of the structure of the media. Media samples were a composite of rayon and a sheath/core bi-component polyester fiber with a nominal mean diameter of 14 μm and a nominal mean length of 6 mm (ADVANSA 271P). The furnish design variables are listed in TABLE 7 and were mixed to create a range of media samples. Furnish parameters were varied to target different media properties shown in TABLE 8.

TABLE 7

Ranges of Furnish Design Factors Used in Media Samples

Target Basis Weight (g/m²)

| 80 | 92 | 120 | 148 | 160 |
|----|----|-----|-----|-----|

Mass Ratio of Rayon (%)

| 24 | 31 | 48 | 65 | 72 |
|----|----|----|----|----|

Rayon Fiber Diameter

| 17 μm (Minifibers Viscose Rayon 3.0 dpf (denier per filament) × 6mm) | 20 μm (Minifibers Viscose Rayon 4.5 dpf × 6 mm) |
|---|---|

Drying Procedures

| Forced air oven | Hot plate drier | Hot plate drier, then heated compression with 40 kg weight. |
|---|---|---|

TABLE 8

Properties of Media Samples

| Media Property | Minimum Value | Maximum Value |
|---|---|---|
| Media Thickness | 0.5 mm | 2.5 mm |
| Media Solidity Measured at 1.5 psi | 3% | 20% |

Figure 10A:
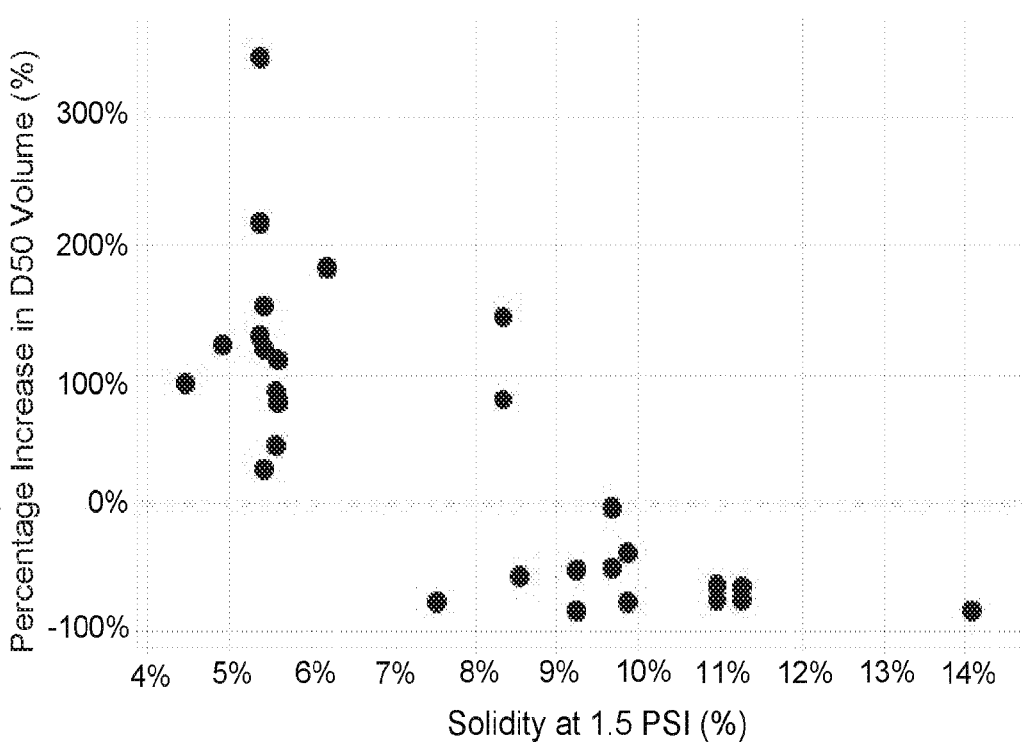
FIGS. 10A and 10B are graphical representations of results from Example 6.
Figure 10B:
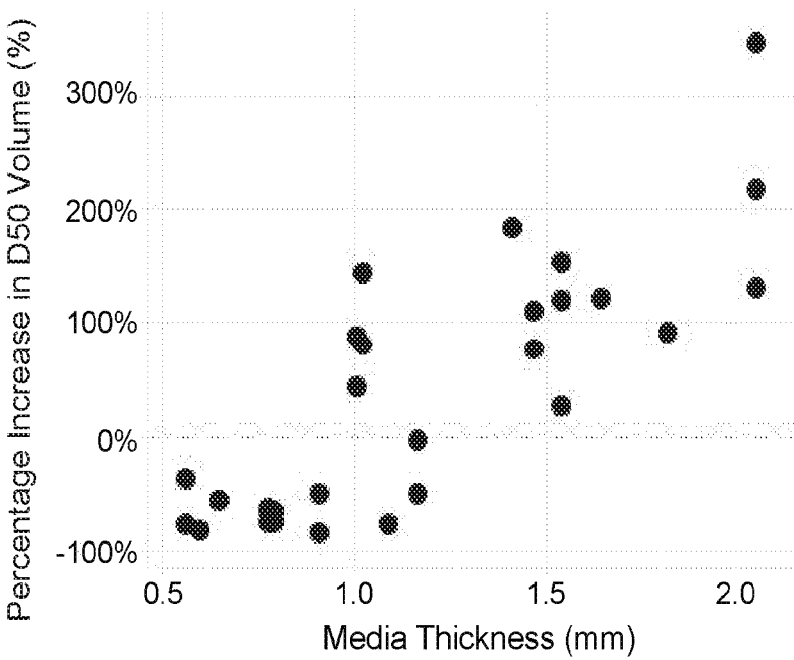

The percentage increase in D50 was determined as a function of media solidity, media thickness, and fiber size. The results are shown in FIGS. 10A-10B, respectively.

It was noted that solidity and thickness are not independent from each other. In order to prepare higher solidity medias, the media was compressed, which caused a lower thickness. Distinguishing between effects due to solidity and thickness may be challenging. However, it was observed that decreasing solidity, which increases thickness, resulted in better growth performance.

It was observed that benefits in growth performance could be obtained at a thickness greater than 1 mm. It was further observed that benefits in growth performance could be obtained at a solidity of less than 7.5%, and in particular, less than 9%.

Example 7

Various aspects of woven stainless steel screens and other variables were tested in Example 7 for the porous barrier stage. Such aspects included opening size, surface chemistry, face velocity, and the size of the bubbles reaching the porous barrier on the upstream side.

Preparation of samples. Various screens were obtained from commercial sources. Screen samples were cut to fit the media holder, with an effective area of 12.9 cm². The screen sample was placed in an in-line test cell.

Test procedure. The test procedure was the same as in Example 6 above.

Image Data Processing. Image processing was performed as in Examples 3-5 above. The bubble volume was estimated from the Feret diameter of the bubbles. The Feret diameter is referred to as the "bubble diameter" in this document for the screen barrier stage.

Data Analysis. Screen performance was calculated as follows:

$$[\text{Screen Perfomance } (\%)] = \frac{\text{Mean } vol(10 \text{ largest bubbles}_{Downstream}) - \text{Mean } vol(10 \text{ largest bubbles}_{Upstream})}{\text{Mean } vol(10 \text{ largest bubbles}_{Upstream})}$$

Screen performance is the percent difference of the mean of the 10 largest bubbles downstream compared to the mean of the 10 largest bubbles upstream, per a test.

Performance of 0% is interpreted as no change in bubble volume at the screen. Below 0% is interpreted as poor performance, above 0% but below 100% is interpreted as a modest increase in size, above 100% but below 250% is interpreted as a notable improvement in size, and above 250% is interpreted as a significant improvement in size.

Testing and Results. The screen was a stainless steel plain weave screen. Various screens were tested, along with an oleophobic treatment applied, with varying properties as shown in TABLE 9 below. Screens were obtained from McMaster-Carr in Elmhurst, Illinois

TABLE 9

Furnish Design of Screen-Barrier Media Samples

| McMaster Part Number | Mesh | Nominal Opening Size (μm) | Oleo Treatment |
|---|---|---|---|
| 9241T45 | 120 × 108 | 145 × 120 | Untreated Oleophilic |
| 85385T116 | 325 × 325 | 50 × 50 | Untreated Oleophilic |
| 85385T103 | 120 × 120 | 117 × 117 | Untreated Oleophilic |
| 9319T182 | 80 × 80 | 178 × 178 | Untreated Oleophilic |
| 85385T116 | 325 × 325 | 50 × 50 | Treated Oleophobic |
| 85385T103 | 120 × 120 | 117 × 117 | Treated Oleophobic |
| 9319T182 | 80 × 80 | 178 × 178 | Treated Oleophobic |

The screen samples were run at different face velocities of 0.5 cm/sec, 1.25 cm/sec, and 5.0 cm/sec to test the impact of face velocity on screen performance.

The air bubble challenge was either classified as "coarse" with a mean nominal Feret diameter of 550 μm or "fine" with a mean nominal Feret diameter of 350 μm. Air flow rate was adjusted to account for face velocity changes to maintain a similar upstream bubble challenge size.

Figure 11A:
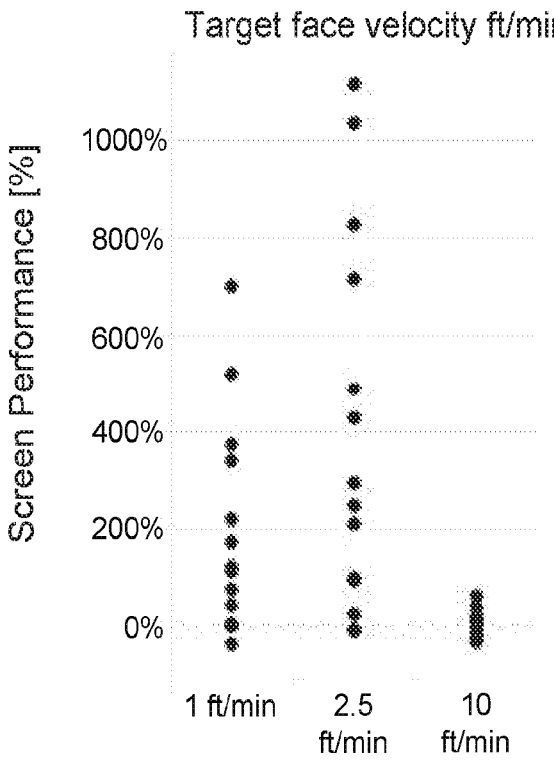
FIGS. 11A and 11B are graphical representations of results from Example 7.

The results of the test are shown in FIG. 11A. It was observed that generally, as face velocity increases, screen performance decreases.

The effect of oleophobic surface treatment on the performance of the screen was also tested. Screens were treated with trichloro(1H,1H,2H,2H-perfluorooctyl)silane (available from Millipore Sigma, St. Louis, MO) using chemical vapor deposition. In brief, a screen was placed under vacuum for at least 10 minutes and the treatment chemical was applied onto the screen in vapor form. After treatment the oleophobic rating of samples was tested by the AATC 118 method; all treated samples had an oleophobic rating of at least 6.

Figure 11B:
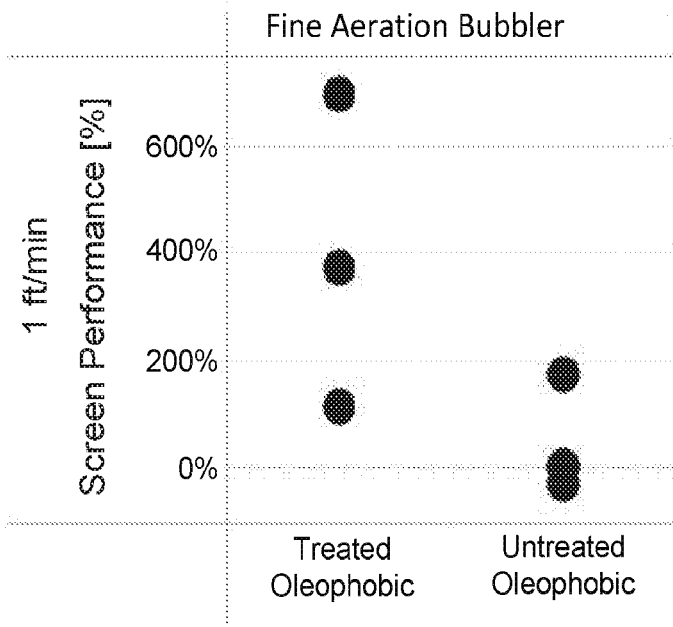

The results of the test are shown in FIG. 11B. It was observed that at a lower face velocity of 0.5 cm/sec and the oleophobic treatment improved screen performance, particularly with regard to fine bubbles.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A deaerator for use in a hydraulic system, the deaerator comprising:

a cylindrical body comprising:

gas nucleation media configured to induce nucleation of gas dissolved in a hydraulic fluid to form gas cavities, wherein the gas nucleation media has a mean pore size of 30 μm or less as measured by ASTM F316 and a basis fiber surface area of 10 m²/m² to 200 m²/m² as measured by the Carmen-Kozeny method;

growth media adjacent and downstream of the gas nucleation media, the growth media having a solidity of 20% or less at 1.5 psi and being capable of inducing coalescence or growth or coalescence and growth of the gas cavities;

a porous barrier adjacent and downstream of the growth media, the porous barrier comprising a wire mesh or a woven screen and having openings forming an outlet, the openings being sized 125 μm or smaller;

a top comprising an inlet; and a closed bottom end cap.

2. The deaerator of claim 1 further comprising a gap between the growth media and the porous barrier.

3. The deaerator of claim 1, wherein the gas nucleation media comprises particulate filtration media.

4. The deaerator of claim 1, wherein the gas nucleation media comprises cellulose, regenerated cellulose, polyamide, polyester, polyethersulfone (PES), polypropylene (PP), polyethylene (PE), polytetrafluoroethylene (PTFE), polyvinylidene difluoride (PVDF), glass, ceramic, carbon fiber, or a combination thereof.

5. The deaerator of claim 1, wherein the gas nucleation media comprises material having an oil contact angle of at least 30°.

6. The deaerator of claim 1, wherein the gas nucleation media comprises oleophobic material having an oleophobic rating of 1 or greater as measured by the AATCC method 118.

7. The deaerator of claim 1, wherein the growth media comprises a plurality of layers of media.

8. The deaerator of claim 1, wherein the growth media is immediately adjacent the gas nucleation media.

9. The deaerator of claim 1, wherein the growth media comprises cellulose, regenerated cellulose, polyamide, polyester, polyethersulfone (PES), polypropylene (PP), polyethylene (PE), polytetrafluoroethylene (PTFE), polyvinylidene difluoride (PVDF), glass, ceramic, carbon fiber, or a combination thereof.

10. The deaerator of claim 1, wherein the porous barrier comprises openings sized 250 μm or less.

11. The deaerator of claim 1 further comprising a liner.

12. The deaerator of claim 1 further comprising a first end cap comprising an opening defining the inlet.

13. The deaerator of claim 1, wherein the gas nucleation media surrounds and defines an open deaerator interior.

14. The deaerator of claim 1, wherein the growth media has a solidity of 9% or less at 1.5 psi and a thickness of 0.8 mm or greater.

15. The deaerator of claim 1, wherein the growth media comprises a composite of oleophilic components and oleophobic components, wherein the oleophobic components have an oleophobic rating of 1 or greater as measured by AATCC method 118.

16. The deaerator of claim 1, wherein the porous barrier comprises an oleophobic surface with an oleophobic rating of 1 or greater as measured by AATCC method 118.

17. The deaerator of claim 1, wherein the porous barrier comprises a composite of oleophilic components and oleophobic components, wherein an oleophobic component has an oleophobic rating of 1 or greater as measured by AATCC method 118.

18. A system for removing gas from a hydraulic fluid, the system comprising:

a tank comprising a fluid inlet and a fluid outlet and having a fluid flow path from the fluid inlet to the fluid outlet; and the deaerator of claim 1 disposed inside the tank.

*     *     *     *     *